(12) United States Patent
Wilkinson et al.

(10) Patent No.: US 12,141,330 B2
(45) Date of Patent: Nov. 12, 2024

(54) MULTIPLE KEY MANAGEMENT

(71) Applicant: Graphcore Limited, Bristol (GB)

(72) Inventors: Daniel John Pelham Wilkinson, Bristol (GB); Graham Bernard Cunningham, Chippenham (GB); Stavros Volos, Cambridge (GB); Kapil Vaswani, Cambridge (GB); Cedric Alain Marie Fournet, Cambridge (GB); Balaji Vembu, Folsom, CA (US)

(73) Assignee: GRAPHCORE LTD., Bristol (GB)

( * ) Notice: Subject to any disclaimer, the term of this patent is extended or adjusted under 35 U.S.C. 154(b) by 655 days.

(21) Appl. No.: 17/374,925

(22) Filed: Jul. 13, 2021

(65) Prior Publication Data
US 2022/0019700 A1    Jan. 20, 2022

(30) Foreign Application Priority Data

Jul. 14, 2020 (GB) ..................................... 2010823

(51) Int. Cl.

| | |
|---|---|
| *G06F 21/72* | (2013.01) |
| *G06F 3/06* | (2006.01) |
| *G06F 21/78* | (2013.01) |
| *H04L 9/06* | (2006.01) |
| *H04L 9/08* | (2006.01) |
| *H04L 9/14* | (2006.01) |
| *H04L 9/32* | (2006.01) |

(52) U.S. Cl.
CPC ............ *G06F 21/72* (2013.01); *G06F 3/0623* (2013.01); *G06F 3/0659* (2013.01); *G06F 3/0683* (2013.01); *G06F 21/78* (2013.01); *H04L 9/0618* (2013.01); *H04L 9/0631* (2013.01); *H04L 9/0894* (2013.01); *H04L 9/14* (2013.01); *H04L 9/3242* (2013.01)

(58) Field of Classification Search
CPC ...... G06F 21/72; G06F 3/0623; G06F 3/0659; G06F 3/0683; G06F 21/78; H04L 9/0618; H04L 9/0631; H04L 9/0894; H04L 9/14; H04L 9/3242
See application file for complete search history.

(56) References Cited

U.S. PATENT DOCUMENTS

| | | | |
|---|---|---|---|
| 9,537,657 B1 * | 1/2017 | Char | .................... H04L 9/0637 |
| 2009/0196417 A1 * | 8/2009 | Beaver | ................... G06F 21/80 |
| | | | 380/45 |

(Continued)

*Primary Examiner* — Ayoub Alata
(74) *Attorney, Agent, or Firm* — HAYNES AND BOONE, LLP

(57) ABSTRACT

A system and method for encrypting and decrypting data exchanged between a multi-tile processing unit and a storage, where a plurality of keys are used for the encryption. Each of the plurality of keys is associated with a different one or more sets of the processors. Encryption hardware is configured to select a key to use for encryption/decryption operations in dependence upon the set of tiles associated with the data being exchanged. Each write request from a tile contains identifier bits associated with that tile's set of tiles, enabling the encryption hardware to select the key to use for encrypting the data in the write request. Each read completion for a tile contains identifier bits associated with that tile's set of tiles, enabling the encryption hardware to select the key to use for decrypting the data in the read completion.

29 Claims, 12 Drawing Sheets

(56) References Cited

U.S. PATENT DOCUMENTS

| | | | | |
|---|---|---|---|---|
| 2013/0013570 A1* | 1/2013 | Yamakawa | ............ | G06F 3/0641 |
| | | | | 707/E17.007 |
| 2014/0189365 A1* | 7/2014 | Cox | ........................ | G06F 21/72 |
| | | | | 713/189 |
| 2015/0380046 A1* | 12/2015 | Starr | ..................... | G06F 3/0623 |
| | | | | 713/153 |
| 2019/0156043 A1* | 5/2019 | Chhabra | ................ | H04L 9/0877 |
| 2019/0236022 A1* | 8/2019 | Gopal | ................... | G06F 3/0673 |

* cited by examiner

MULTIPLE KEY MANAGEMENT

CROSS-REFERENCE TO RELATED APPLICATIONS

The present application claims priority to United Kingdom Patent Application No. GB2010823.9, filed Jul. 14, 2020, the disclosure of which is incorporated herein by reference in its entirety.

TECHNICAL FIELD

The present disclosure relates to an integrated circuit comprising a processing unit and at least one encryption unit, and in particular to identifying keys for encryption and decryption of data transferred between processors of the processing unit and storage external to the processing unit.

BACKGROUND

In the context of processing data for complex or high volume applications, a work accelerator may be a subsystem to which processing of certain data is offloaded from a host system. Such a work accelerator may include specialised hardware for performing specific types of processing of workloads.

In order to supply input data for processing by the accelerator subsystem, that data may first be stored in a storage external to the accelerator subsystem, with the accelerator subsystem being operable to issue read requests to obtain the data from the external storage for processing. When the accelerator has finished processing a certain amount of data, the accelerator may then issue write requests to write new results computed from the data hack to the storage external to the accelerator subsystem.

Although the accelerator subsystem is secure and trusted, the storage external to the accelerator—and a host system that manages it—may be untrusted. Therefore, in order to provide a confidentiality guarantee that prevents the input data and results held in the external storage being interpretable by malicious third parties, it is desirable to encrypt the data held in the external storage, with that data being decrypted before being processed by the accelerator subsystem.

SUMMARY

In some circumstances, it may be desirable to encrypt and decrypt the data exchanged between the accelerator subsystem and the external storage using a plurality of different keys. For example, in some circumstances, multiple different users may wish to supply data to be processed by the accelerator subsystem. In this case, the input data may be encrypted by different users using different keys since, as well as keeping their data confidential from malicious third parties, the users may desire to keep their data confidential from one another.

When supplying data to an accelerator subsystem, one problem that arises is how to identify the key to be used to decrypt the data. If a plurality of different keys are available to use for decryption of data, identifying an appropriate key to use for decryption operations is non-trivial.

According to a first aspect, there is provided an integrated circuit for acting as an accelerator subsystem for processing data received from a storage, the integrated circuit comprising: a processing unit comprising a plurality of sets of processors, wherein each of the processors is operable to issue read requests to read data from the storage; at least one encryption unit comprising a memory configured to store a plurality of keys, wherein each of at least some of the keys are associated with different ones of the sets of processors, wherein the at least one encryption unit comprises processing circuitry configured to: receive a read completion formed in response to a read request issued by a first processor belonging to one of the sets of processors, the read completion comprising data read from the storage; identify from one or more identifier bits in the read completion, a key of the plurality of keys that is associated with the one of the sets of processors to which the first processor belongs; using the identified key, perform decryption operations with respect to the data contained in the read completion to form decrypted data; and cause the read completion to be returned to the first processor with the decrypted data.

The accelerator subsystem incorporates a processing unit having a number of processors. The processors are divided into a plurality of sets of processors, with different sets of processors being associated with different keys. By associating different keys with different processors, the key to be used to decrypt data may be identified in dependence upon the set of processors from which the request originated. This identification mechanism may reduce constraints and overheads in other parts of the system that would otherwise be necessary to identify the key to be used for decrypting the data. Furthermore, this mechanism may allow for different data sets encrypted with different keys (e.g. data sets associated with different tenants) to be kept separate from one another even if they are processed by the same processing unit, since processors are unable to decrypt data when that data has been encrypted with a key with which they are not associated.

In some embodiments, the first processor comprises at least one execution unit configured to execute computer readable instructions to cause the read request to be transmitted with the one or more identifier bits.

In some embodiments, the integrated circuit, comprises an interface to the storage, wherein the interface comprises processing circuitry configured to: receive the read request issued by the first processor; store in a look up table of the interface, the one or more identifier bits extracted from the read request; upon receiving the read completion returned in response to the read request, insert the one or more identifier bits into the read completion before providing said read completion to the at least one encryption unit.

In some embodiments, the at least one encryption unit comprises a plurality of context storages, each of the context storages being for storing state information associated with an encryption frame comprising a plurality of read completions, wherein each of the context storages is associated with one or more of the sets of processors, wherein the processing circuitry of the at least one encryption unit is configured to: identify from the one or more identifier bits, one of the context storages associated with the one of the sets of processors comprising the first processor; and use said identified one of the context storages for storing state information associated with an encryption frame comprising the read completion.

In some embodiments, each of the keys is associated with one or more of the context storages to be used for storing state information associated with decryption operations performed using the respective key.

In some embodiments, the step of identifying the one of the keys comprises: performing the step of identifying the one of the context storages by obtaining an identifier of the one of the context storages from a first register of the at least one encryption unit; and using the identifier of the one of the context storages to identify from a second register of the at least one encryption unit, the one of the keys which is associated with the identified one of the context storages.

In some embodiments, the first processor comprises at least one execution unit configured to execute computer readable instructions to cause the read request to be transmitted with the one or more identifier bits, wherein the processing unit is configured to receive from the host at least part of the computer readable instructions.

In some embodiments, the read completion comprises a message authentication code, wherein the processing circuitry of the at least one encryption unit is configured to check that the message authentication code matches an expected message authentication code for the data read from the storage.

In some embodiments, the decryption operations are performed using at least part of an initialisation vector contained in the read completion.

In some embodiments, the processing circuitry of the at least one encryption unit is configured to complete the initialisation vector.

In some embodiments, the processing circuitry of the at least one encryption unit is configured to increment the initialisation vector using a counter value for each block of ciphertext data contained in the read completion.

In some embodiments, the storage is a memory of the integrated circuit.

In some embodiments, the memory is a dynamic random access memory.

In some embodiments, the decryption operations are performed according to the advanced encryption standard.

According to a second aspect, there is provided an integrated circuit for acting as an accelerator subsystem for processing data and writing the results of said processing to a storage, the integrated circuit comprising: a processing unit comprising a plurality of sets of processors, wherein each of the processors is operable to issue write requests to write data to the storage; at least one encryption unit comprising a memory configured to store a plurality of keys, wherein each of at least some of the keys are associated with different ones of the sets of processors, wherein the at least one encryption unit comprises processing circuitry configured to: receive a write request issued by a first processor belonging to one of the sets of processors, the write request comprising data to be written to the storage; identify from one or more identifier bits in the write request, one of the keys that is associated with the one of the sets of processors to which the first processor belongs; using the identified key, perform encryption operations with respect to the data contained in the write request to form encrypted data; and cause the write request to be sent to the storage so as to write the encrypted data to the storage.

The accelerator subsystem incorporates a processing unit having a number of processors. The processors are divided into a plurality of sets of processors, with different sets of processors being associated with different keys. As with the decryption of data in response to read requests, by associating different keys with different processors, the key to be used to encrypt data may be identified in dependence upon the set of processors from which the write request was received.

The first aspect and the second aspect represent closely related alternative solutions to the same technical problem.

In some embodiments, the at least one encryption unit comprises a plurality of context storages, each of the context storages being for storing state information associated with an encryption frame comprising a plurality of write requests, wherein each of the context storages is associated with one or more of the sets of processors, wherein the processing circuitry of the at least one encryption unit is configured to: identify from the one or more identifier bits, one of the context storages associated with the one of the sets of processors comprising the first processor; and use said identified one of the context storages for storing state information associated with performing encryption processing for an encryption frame comprising the write request.

In some embodiments, each of the keys is associated with one or more of the context storages to be used for storing state information associated with encryption operations performed using the respective key.

In some embodiments, the step of identifying the one of the keys comprises: performing the step of identifying the one of the context storages associated with the write request; and using an identifier of the identified one of the context storages to identify the one of the keys that is associated with the identified one of the context storages.

In some embodiments, the first processor comprises at least one execution unit configured to execute computer readable instructions to cause the write request to be transmitted with the one or more identifier bits.

In some embodiments, the one or more identifier bits comprise an index of the one of the keys.

In some embodiments, the one or more identifier bits comprise an identifier of the first processor.

In some embodiments, the one or more identifier bits comprise an identifier of the one of the sets of processors to which the first processor belongs.

In some embodiments, the storage is a memory of a host device configured to supply workloads to the accelerator subsystem.

In some embodiments, the first processor comprises at least one execution unit configured to execute computer readable instructions to cause the write request to be transmitted with the one or more identifier bits, wherein the processing unit is configured to receive from the host at least part of the computer readable instructions.

In some embodiments, the processing circuitry of the at least one encryption unit is configured to calculate a message authentication code for the data to be written to the storage.

In some embodiments, the encryption operations are performed using at least part of an initialisation vector contained in the write request.

In some embodiments, the processing circuitry of the at least one encryption unit is configured to complete the initialisation vector.

In some embodiments, the processing circuitry of the at least one encryption unit is configured to increment the initialisation vector using a counter value for each block of plaintext data contained in the write request.

In some embodiments, the storage is a memory of the integrated circuit.

In some embodiments, the memory is a dynamic random access memory.

In some embodiments, the decryption operations are performed according to the advanced encryption standard.

According to a third aspect, there is provided a method for decrypting data read by a processing unit comprising a plurality of sets of processors, wherein each of the processors is operable to issue read requests to read data from a storage and to process said data read from storage, the method comprising: storing a plurality of keys, wherein each of at least some of the keys are associated with different ones of the sets of processors; receiving a read completion formed in response to a read request issued by a first processor belonging to one of the sets of processors, the read completion comprising data read from the storage; identifying from one or more identifier bits in the read completion, one of the keys that is associated with the one of the sets of processors to which the first processor belongs; using the identified key, performing decryption operations with respect to the data contained in the read completion to form decrypted data; and causing the read completion to be returned to the first processor with the decrypted data.

In some embodiments, the method comprises at least one execution unit of the first processor executing computer readable instructions to cause the read request to be transmitted with the one or more identifier bits.

In some embodiments, the method comprises: receiving at an interface to the storage, the read request issued by the first processor; storing in a look up table of the interface, the one or more identifier bits extracted from the read request; upon receiving the read completion returned in response to the read request, inserting the one or more identifier bits into the read completion before providing said read completion to the at least one encryption unit.

In some embodiments, the at least one encryption unit comprises a plurality of context storages, each of the context storages being for storing state information associated with an encryption frame comprising a plurality of read completions, wherein each of the context storages is associated with one or more of the sets of processors, wherein the method comprises: identifying from the one or more identifier bits, one of the context storages associated with the one of the sets of processors comprising the first processor; and using said identified one of the context storages for storing state information associated with an encryption frame comprising the read completion.

In some embodiments, each of the keys is associated with one or more of the context storages to be used for storing state information associated with decryption operations performed using the respective key.

In some embodiments, the step of identifying the one of the keys comprises: performing the step of identifying the one of the context storages by obtaining an identifier of the one of the context storages from a first register of the at least one encryption unit; and using the identifier of the one of the context storages to identify from a second register of the at least one encryption unit, the one of the keys which is associated with the identified one of the context storages.

According to a fourth aspect; there is provided a method for encrypting data written by a processing unit comprising a plurality of sets of processors, wherein each of the processors is operable to process data and issue write requests to write results of processing said data to a storage, the method comprising: storing a plurality of keys, wherein each of at least some of the keys are associated with different ones of the sets of processors; receiving a write request issued by a first processor belonging to one of the sets of processors, the write request comprising data to be written to the storage; identifying from one or more identifier bits in the write request, one of the keys that is associated with the one of the sets of processors to which the first processor belongs; using the identified key, performing encryption operations with respect to the data contained in the write request to form encrypted data; and causing the write request to be sent to the storage so as to write the encrypted data to the storage.

In some embodiments, the at least one encryption unit comprises a plurality of context storages, each of the context storages being for storing state information associated with an encryption frame comprising a plurality of write requests, wherein each of the context storages is associated with one or more of the sets of processors, wherein the method comprises: identifying from the one or more identifier bits, one of the context storages associated with the one of the sets of processors comprising the first processor; and using said identified one of the context storages for storing state information associated with performing encryption processing for an encryption frame comprising the write request.

In some embodiments, each of the keys is associated with one or more of the context storages to be used for storing state information associated with encryption operations performed using the respective key.

In some embodiments, the step of identifying the one of the keys comprises: performing the step of identifying the one of the context storages associated with the write request; and using an identifier of the identified one of the context storages to identify the one of the keys that is associated with the identified one of the context storages.

In some embodiments, the method comprises at least one execution unit of the first processor executing computer readable instructions to cause the write request to be transmitted with the one or more identifier bits.

In some embodiments, the one or more identifier bits comprise an index of the one of the keys.

In some embodiments, the one or more identifier bits comprise an identifier of the first processor.

In some embodiments, the one or more identifier bits comprise an identifier of the one of the sets of processors to which the first processor belongs.

In some embodiments, the storage is a memory of a host device configured to supply workloads to the accelerator subsystem.

According to a fifth aspect, there is provided a computer program comprising storing computer readable instructions which, when executed by at least one processor of at least one encryption unit, causes a method according to the third aspect to be performed.

According to a sixth aspect; there is provided a non-transitory computer readable storage medium storing the computer program according to the fifth aspect.

According to a seventh aspect, there is provided a computer program comprising storing computer readable instructions which, when executed by at least one processor of at least one encryption unit, causes a method according to the fourth aspect to be performed.

According to an eight aspect, there is provided a non-transitory computer readable storage medium storing the computer program according to the seventh aspect.

BRIEF DESCRIPTION OF DRAWINGS

For a better understanding of the present disclosure, and to show how the same may be carried into effect, reference will now be made by way of example to the following drawings.

DETAILED DESCRIPTION

The present disclosure relates to a device having at least one encryption unit and a processing unit comprising a plurality of processors.

An example multi-tile processing unit 2 is described with reference to FIG. 1. This example such processing unit 2 may take the form of the IPU (Intelligence Processing Unit), so named to denote its adaptivity to machine learning applications.

Figure 1:
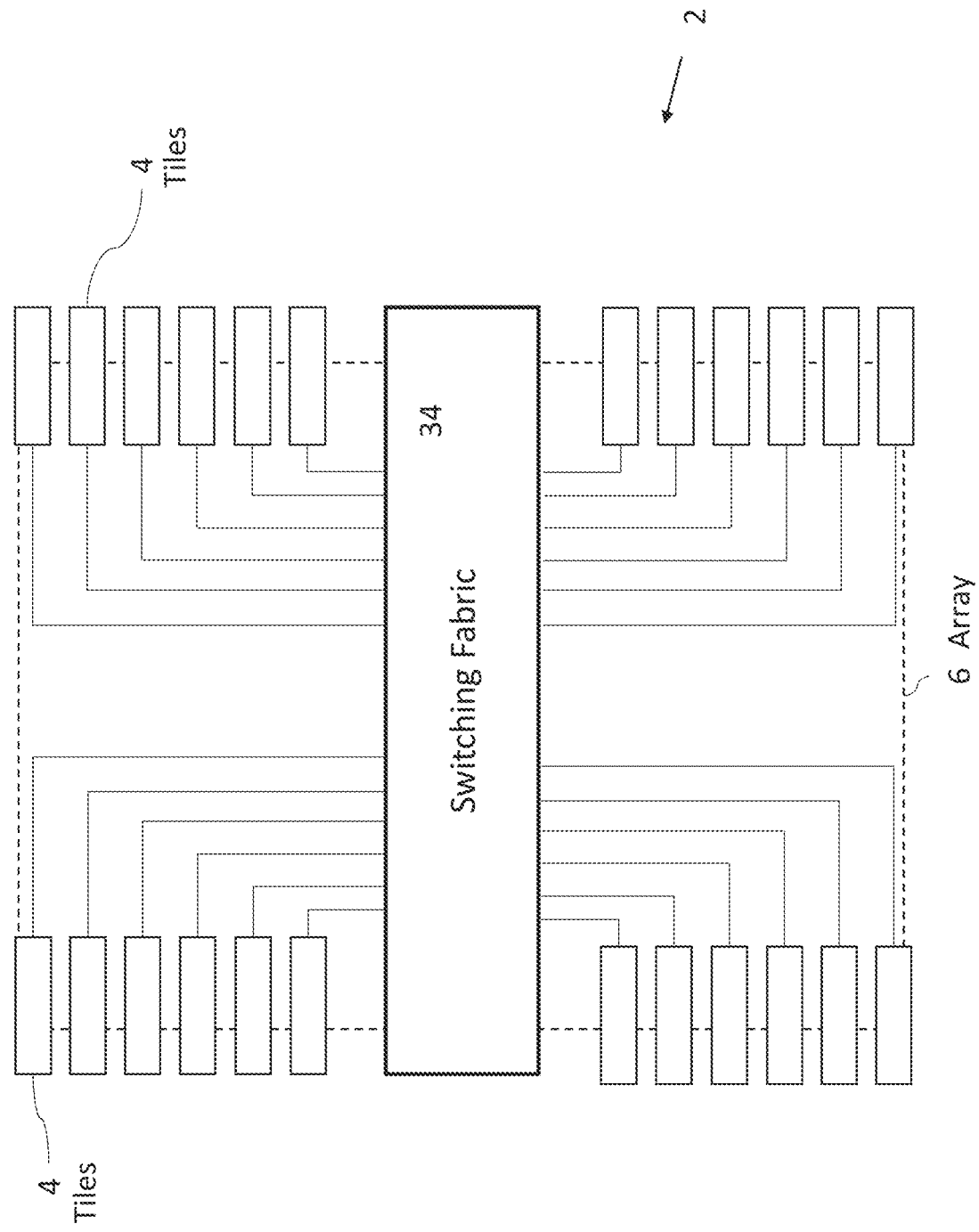
FIG. 1 illustrates an example of a processing unit comprising a plurality of processor tiles.

FIG. 1 illustrates schematically the architecture of the example processing unit 2. The processing unit 2 comprises an array 6 of multiple processor tiles 4 and an interconnect 34 connecting between the tiles 4. The processing unit 2 may be implemented alone or as one of multiple dies packaged in the same IC package. The interconnect 34 may also be referred to herein as the "exchange fabric" 34, as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4. Each tile 4 has its own local memory (described later). The tiles 4 do not share memory.

The processing unit 2 receives work from a host (not shown), which is connected to the processing unit 2 via one of the chip-to-host links implemented on an integrated circuit (i.e. chip) to which the processing unit 2 belongs. The work takes the form of input data to be processed by the processing unit 2. When providing the work, the host may access a computer, which comprises a single such processing unit 2 or a group of multiple interconnected processing units 2, depending on the workload from the host application.

The processing unit 2 comprises a switching fabric 34 to which all tiles 4 and links are connected by sets of connection wires, the switching fabric being stateless, i.e. having no program visible state. Each set of connection wires is fixed end to end. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. Each set of connection wires is pipelined and comprises a series of temporary stores, e.g. latches or flip flops, which hold datum for a clock cycle before releasing it to the next store. Time of travel along each wire is determined by these temporary stores, each one using up a clock cycle of time in a path between any two points. In this way, data exchange between tiles 4 may be conducted on a time deterministic basis.

By sending data between tiles 4 in a time deterministic manner, the "packets" may be sent without destination identifiers, which would permit an intended recipient to be uniquely identified. The packets may, however, include headers indicating at least one direction of travel through the switching fabric 34.

Figure 2:
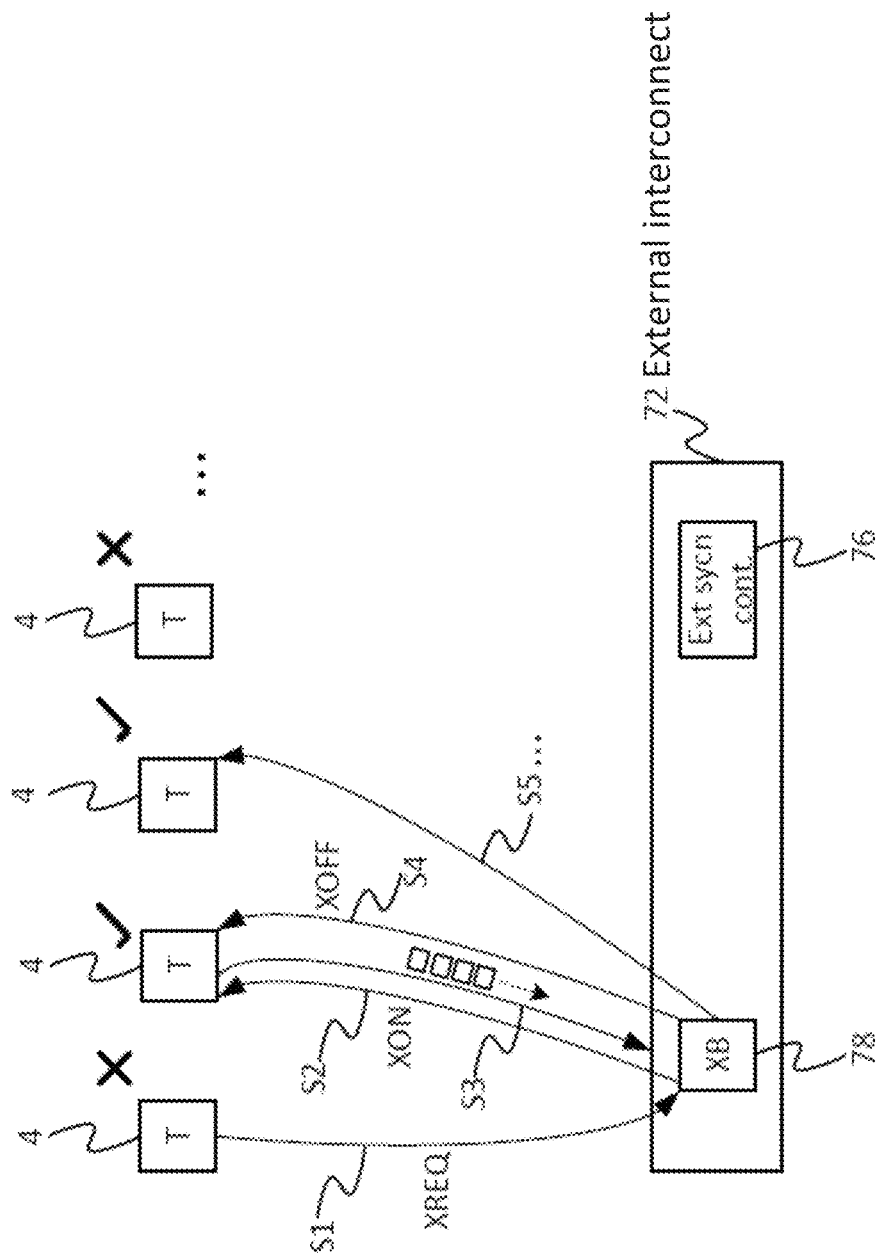
FIG. 2 illustrates an arrangement for sending data packets off chip from tiles.

FIG. 2 illustrates an exemplary mechanism for sending data packets from tiles 4 to destinations external to the processing unit 2. This mechanism is non-time-deterministic. The mechanism is implemented in dedicated hardware logic in the external interconnect 72. The external interconnect 72 is implemented on the same chip as the tiles 4. Data is sent over the external interconnect 72 in the form of packets. Unlike the packets sent over the internal interconnect 34; these packets have headers: as the order of transmission can change, they require the destination address to be present in the packet header. The external interconnect 72 includes a routing table for statically routing the data packets in dependence upon the headers of the data packets.

At the physical layer, the interconnect mechanism is lossy, but at the transaction layer, the mechanism is not lossy due to the architecture of the link layer: if a packet is not acknowledged it will be resent automatically by the hardware in the interconnect 72. The possibility for loss and resending at the data link layer, however, means that the delivery of data packets over the external interconnect 72 is not time-deterministic. Further, all the packets of a given exchange may arrive together or separated apart in time, and in any order, so the external interconnect uses flow control and queuing. Further; the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated; the external interconnect 72 comprises an external exchange block (XB) 78. The compiler nominates one of the tiles 4 to send an external exchange request (XREQ) to the exchange block 78 (operation S1). The XREQ is a message comprising one or more control packets, indicating which of the tiles 4 have data packets (content) to send. This is illustrated schematically in FIG. 2 by the ticks and crosses: by way of an example scenario, those labelled with a tick have data packets to send externally and those labelled with a cross do not. In operation S2; the exchange block 78 sends an exchange-on (XON) control packet to a first of the tiles 4 with packets to send externally. This causes the first tile to start sending its packets to the relevant destination via the external interconnect 72 (operation S3). The packets received from the first tile 4 at the external interconnect 72 are statically routed to the destination using a routing table in the external interconnect 72. If at any time, the XB 78 is unable to continue sending packets to the interconnect (e.g. due to a previous packet loss and re-transmission in the interconnect, or due to over-subscription of the external interconnect by many other XBs and tiles), the XB 78 will send an exchange-off (XOFF) to that tile 4 before the XBs 78 queue overflows. Once the congestion is cleared and the XB 78 again has sufficient space in its queue it will send an XON to the tile 4 allowing it to continue transmitting its content. Once this tile 4 has sent its last packet, then in operation S4 the exchange block 78 sends an exchange-off (XOFF) control packet to this tile 4, then in operation S5 sends another XON to the next tile 4 with packets to send, and so forth. The signalling of XON and XOFF are implemented as a hardware mechanism in dedicated hardware logic in the form of the external exchange block 78.

Although in FIG. 2, only a single exchange block 78 is shown, in embodiments there are a plurality of different such exchange blocks 78 for a single processing unit 2, with each of the exchange blocks 78 serving a subset of the tiles 4 in the processing unit 2. In an implementation, for example, the integrated circuit in which the processing unit 2 is formed comprises eight exchange blocks, each of which performs the functions shown in FIG. 2 for one-eighth of the tiles 4 in the processing unit. Furthermore, each exchange block 78 comprises a plurality of distinct modules (referred to as exchange block contexts), which each perform the operations shown in FIG. 2 for a smaller subset of the tiles 4. For example, each exchange block may comprise four exchange block contexts, with each exchange block context being arranged to perform the Xon/Xoff signalling shown in FIG. 2 for one-thirty-second of the tiles 4 in the processing unit 2. The exchange block contexts are described in more detail later in this application.

Figure 3:
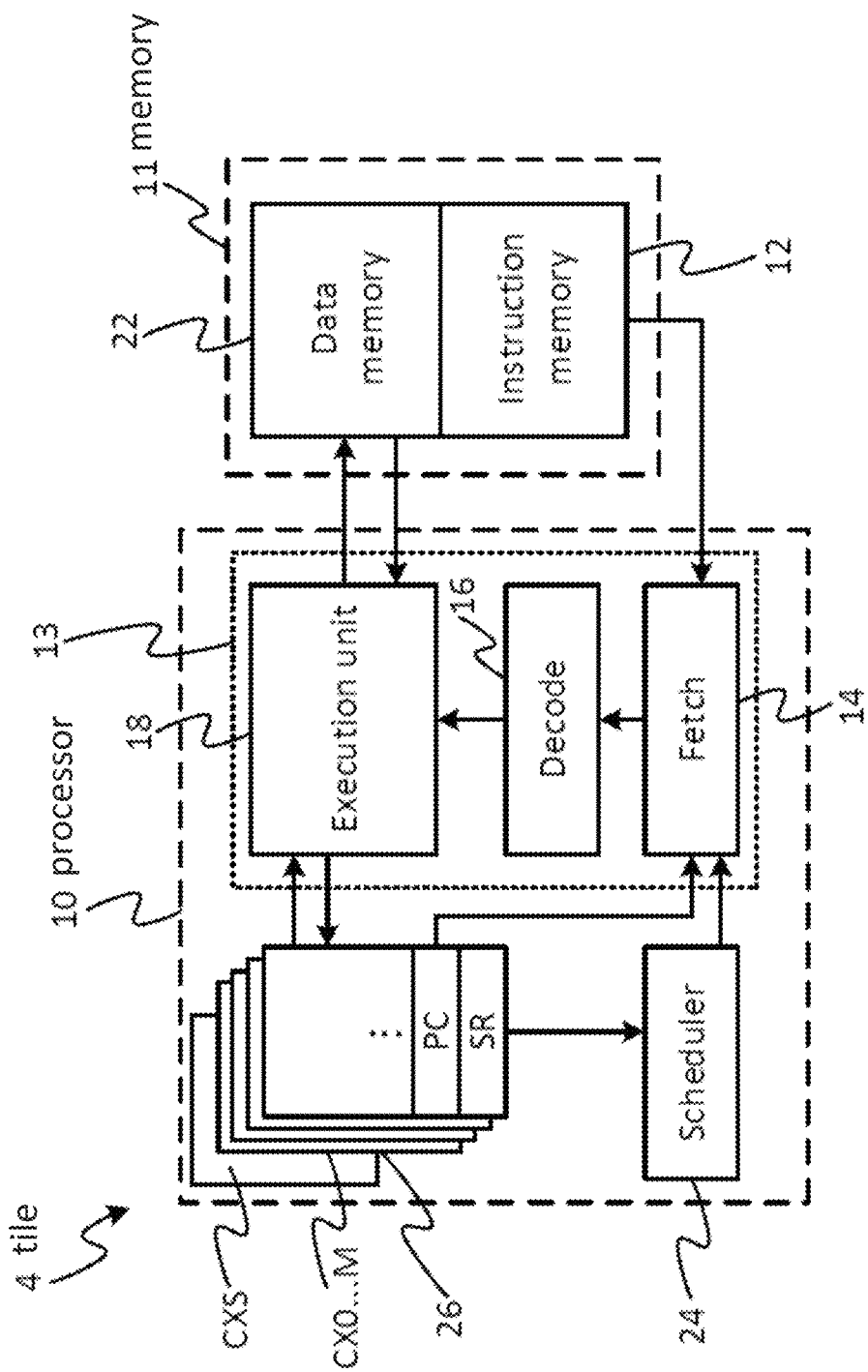
FIG. 3 is a schematic diagram of a the that forms part of the multi-tile processing unit.

Each of the processor tiles 4 comprises processing circuitry and memory. In some example embodiments, the processing circuitry is a multi-threaded processor 10. FIG. 3 illustrates an example of a processor tile 4 in accordance with embodiments of the present disclosure. The processor tile 4 comprises a multi-threaded processor 10 in the form of a barrel-threaded processor 10, and a local memory 11 (i.e. on the same tile in the case of a multi-tile array, or same chip in the case of a single-processor chip). A barrel-threaded processor 10 is a type of multi-threaded processor 10 in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

Within the processor 10, multiple different ones of the threads from the instruction memory 12 can be interleaved through a single execution pipeline 13 (though typically only a subset of the total threads stored in the instruction memory can be interleaved at any given point in the overall program). The multi-threaded processor 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processor 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

It is desirable in some circumstances to provide for the confidentiality of data that is provided for execution by tiles 4 off a processing unit 2. Typically, confidentiality is provided by encryption of data. One type of encryption algorithm that is useful for the encryption of large amounts of data is a block cipher encryption, which operates on fixed sized groups of data, referred to as blocks. These blocks are transported in encryption frames, which each comprise one or more data packets over which a set of blocks are spread.

There are different types of block cipher modes of operation, and some of these make use of unique set of data referred to as an initialisation vector. The initialisation vector ensures that different encrypted data is produced from the same unencrypted data by the encryption algorithm. This has the advantage of preventing an attacker from being able to identify patterns in encrypted data.

Figure 4:
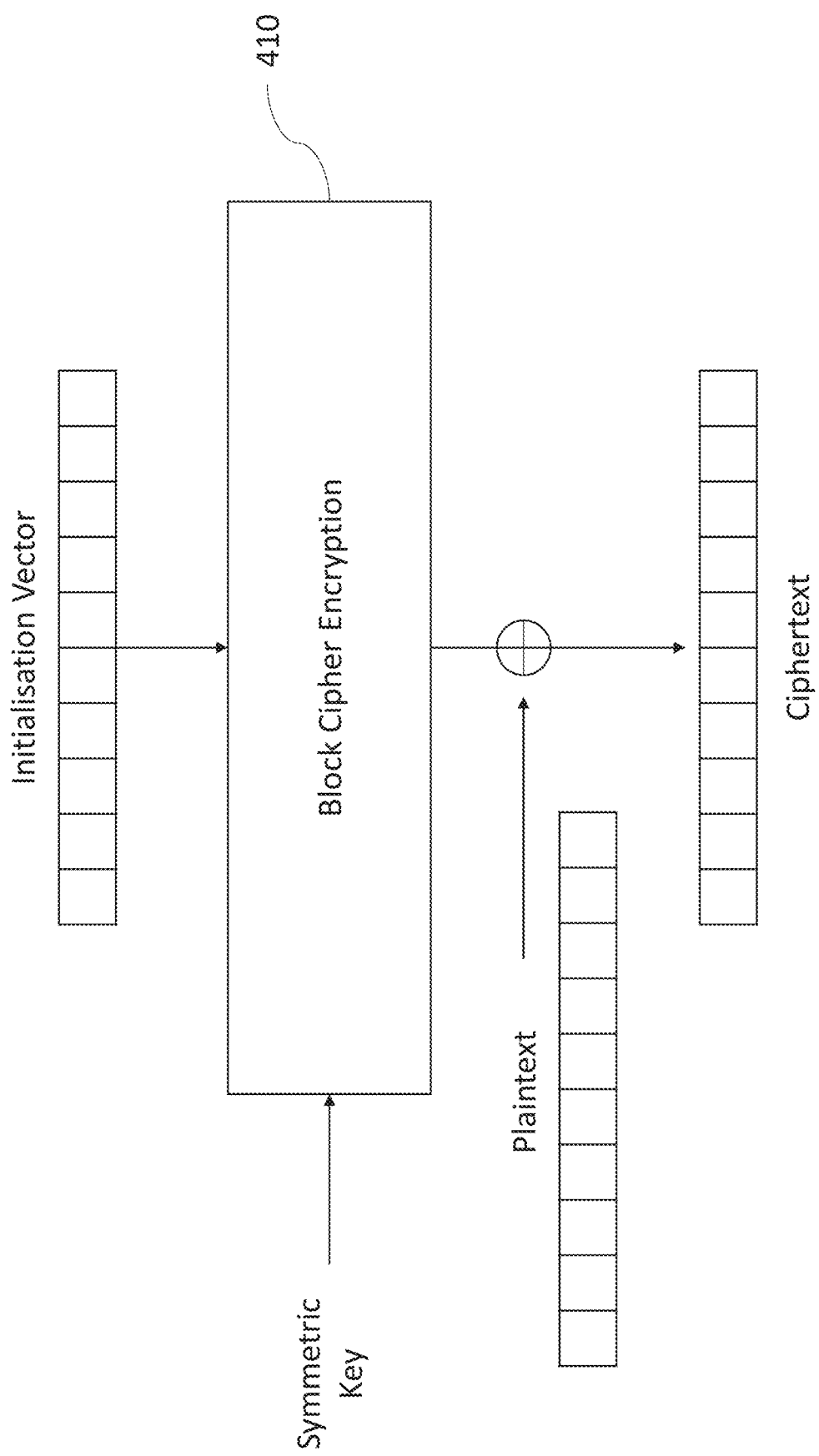
FIG. 4 illustrates a block cipher encryption scheme.

An initialisation vector may be applied in different ways to produce encrypted data. Reference is made to FIG. 4, which illustrates one example of the use of an initialisation vector. A block of unencrypted data is referred to as a block of plaintext, whereas a block of encrypted data is referred to as a block of ciphertext. As may be observed from FIG. 4, the encryption key is not directly applied to the plaintext. Rather, it is the initialisation vector that is encrypted using the encryption key and encryption algorithm 410. The encryption key is a symmetric key. The encrypted initialisation vector is then XORed with the plaintext to produce the ciphertext. A different initialisation vector is used in this manner to encrypt each different block of plaintext, thereby hiding patterns in the original data.

Because of the symmetry of the operation shown in FIG. 4, the decryption algorithm is the same as the encryption algorithm 410. In other words, to obtain the plaintext from the ciphertext, the ciphertext is XORed with the encrypted form of the initialisation vector to obtain the plaintext.

Although FIG. 4 shows an example where the encrypted form of the initialisation vector is XORed with the plaintext, other block cipher modes of operation making use of an initialisation vector may be employed. For example, in another mode of operation, the plaintext may first be XORed with the initialisation vector. The result of the XOR operation then being encrypted using the encryption algorithm 410 to produce the ciphertext.

There are different types of encryption algorithm 410 that may be applied to encrypt data, such as the initialisation vector or plaintext, as part of a block cipher encryption scheme. One widely used standard for performing this encryption is the Advanced Encryption Standard (AES).

Therefore, block ciphers provide for effective encryption of large amounts of data. As well as providing a set of encrypted data, in order to ensure integrity and authentication of data, a sender may also provide, along with the encrypted data, a message authentication code (MAC). This MAC may be calculated using the ciphertext or plaintext and allows a recipient to determine the sender of the data and to detect any changes to the data.

The calculation of the MAC may also be performed in dependence upon each of the initialisation vectors used to perform encryption/decryption processing for each of these blocks. The resulting combination of the blocks and the MAC are transmitted together in one or more packets, which is referred to as an encryption frame. Thus an encryption frame comprises one or more blocks (which may be ciphertext blocks or plaintext blocks) and a MAC, with the MAC being calculated in dependence upon all of the blocks of the encryption frame to which it belongs. The MAC may be a Galois Message Authentication Code (GMAC) that is calculated in accordance with Galois/Counter Mode (GCM) operation.

Figure 5:
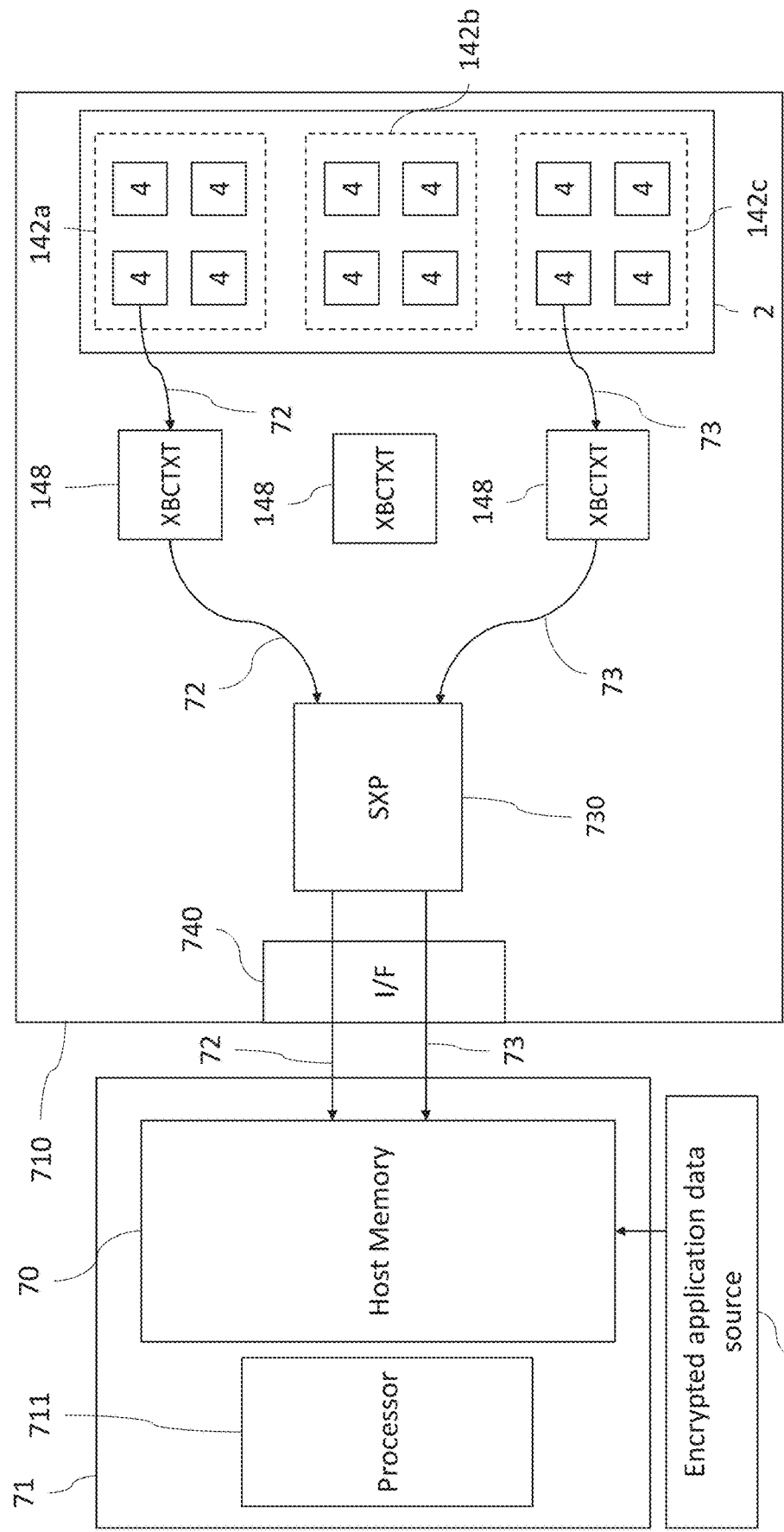
FIG. 5 illustrates the issuance of write requests from tiles of a processing unit to write data to host memory.

Reference is made to FIG. 5, which illustrates an example device 710 according to embodiments of the disclosure. The device 710 is an integrated circuit (i.e. a chip) of which the processing unit 2 is a part. The processing unit 2 is a multi-tile processing unit 2 comprising tile processors 4 as discussed. The tiles 4 are configured to read data from and write data to a host memory 70 of a host system 71 external to the device 710. The host system 71 is untrusted and is unable to decrypt the application data stored in memory 70.

The host system 71 is connected to a data source 720. The application data source 720 is a further data processing system that is configured to communicate with the processing unit 2 via the host system 71. The application data source 720 provides the compiled executable code that executes on the processing unit 2 by writing this code in encrypted form to the host memory 70. It is also the data source 720, which provides encrypted application data for processing by the processing unit 2 by storing that data in the host memory 70. This data is read by the tiles 4 of the processing unit 2. Additionally, the tiles 4 write their results of processing to the host memory 70. Since the host system 71 is untrusted, the application data and results are encrypted before being sent through the host 71.

The symmetric keys, which are required to encrypt and decrypt the data, are shared between the application data source 720 and the integrated circuit 710 using a secure exchange protocol. For example, the symmetric keys may be shared between the application data source 720 and the integrated circuit 710 by encrypting the symmetric keys with a public key at the application data source 720 to form an encrypted message to be sent to the integrated circuit 710. That message is then decrypted using a corresponding private key accessible to a root of trust associated with the integrated circuit 710. The host 71 is untrusted and is not provided with access to the symmetric keys.

The tiles 4 are divided into different sets 142*a*, 142*b*, 142*c* (collectively referred to herein as sets 142). Although only three such sets 142 are shown in FIG. 5, the processing unit 2 would likely in practice comprise a larger number of sets 142. Each set of tiles 142 is associated with an exchange block context 148. Each exchange block context 148 is implemented as part of an exchange block 78, as illustrated in FIG. 2. Each exchange block context 148 may comprise dedicated circuitry in an exchange block 78 or may be a software module running on a processor of an exchange block 78. Each exchange block context 148 controls the sending of packets by a set 142 of tiles 4 with which it is associated using the mechanism shown in FIG. 2. In other words, each exchange block context 148 may independently implement the scheme described, with reference to FIG. 2, as being performed by exchange block 78. In this way, an exchange block context 148 is able to enforce constraints preventing its associated tiles 4 from having multiple read requests open at any one time and from issuing multiple write encryption frames at the same time.

The data in the host memory 70 belongs to multiple streams, with different sets of tiles 4 being configured to read and write to different streams with which they are associated. The tiles 4 belonging to one or more sets 142 issue a series of write requests to write blocks of data in a stream associated with that one or more sets 142 to the memory 70. The tiles 4 belonging to one or more sets 142 issue a series of read requests to read blocks of data in a stream associated with that one or more sets 142 from the memory 70.

A stream of data written into the memory 70 comprises a series of write encryption frames. Each write encryption frame comprises one or more blocks of data. Each block of data is a plaintext when output by a tile 4, but is converted to a ciphertext by the SXP 730. Each write encryption frame comprises one or more write request packets, with each write request packet comprising a payload having one or more of the blocks of data. The SXP 730, when processing the encryption frame, calculates a MAC in dependence upon every block of data in the frame and adds the MAC into the payload of the final write request packet of the encryption frame.

A stream of data read from the memory 70 comprises a series of read encryption frames. Each read encryption frame comprises one or more blocks of data and a MAC. Each block of data is a ciphertext when stored in memory 70, but is converted to a plaintext by the SXP 730. Each read encryption frame comprises one or more read completion packets, with each read completion packet comprising a payload having one or more of the blocks of data. The final read completion of the encryption frame includes the MAC in its payload. The SXP 730, when processing the encryption frame, checks this MAC by recalculating the MAC in dependence upon every block of data in the encryption frame and comparing this recalculated MAC to the MAC in the read completion. If there is a match, the authentication passes and the SXP 730 forwards the final read completion to the tile 4 that issued the read request. If they do not match, the final read completion is dropped. The tile 4 is configured to only process the data of the encryption frame if all of the read completions for that frame are received. Therefore, if the final read completion is dropped, the tile 4 will not process any of the data in the preceding completions of the encryption frame.

Different sets of tiles 142 are associated with different keys used for performing encryption and decryption operations for data exchanged between the tiles 4 and the host memory 70. The key for each set of tiles 142 need not be unique, and some sets of tiles 142 may be associated with the same key. The secure exchange pipeline (SXP) 730 stores the plurality of keys and performs the encryption/decryption operations when it receives a write request or read completion for a set of tiles 142 using the key associated with that set of tiles 142.

FIG. 5 shows the sending of write requests by tiles 4 of the processing unit 2. For example, a tile 4 of set 142*a* is shown issuing one or more write requests 72 to write data to host memory 70. A tile 4 of set 142*c* is also shown issuing one or more write requests 73 to write data to host memory 70.

When a tile 4 issues a write request, the write request is issued in a first packet format (referred to as the Tlink format). Such Tlink packets are suitable for transmission along exchange wiring of the processing unit 2. Such a write request is transmitted from its originating tile 4 over wires of the processing unit 2 to an exchange block context 148 associated with the originating tile 4. At the exchange block context 148, the write request is converted from the Tlink format to a second packet format (referred to as the Elink packet format). Such Elink packets are suitable for transmission along wires of the device 710 other than those of the processing unit 2. After having converted the write request to the Elink packet format, the exchange block context 148 sends the write request to the SXP 730.

In response to receipt of a write request, the SXP 730 identifies the key associated with the set of tiles 142 from which the write request originated.

In some example embodiments, the SXP 730 may identify the key based on an explicit identifier of the tile 4 or set of tiles 142 from which a write request originated. In this case, each tile 4 is configured to transmit each write request to host memory 70 with such an identifier in the header of the write request packet.

In some example embodiments, the SXP 730 may identify the key based on an explicit key identifier contained in a write request. In this case, each tile 4 is loaded with a set of computer readable instructions configured to issue write requests containing the key identifier that corresponds to the set of tiles 142 to which the respective tile 4 belongs. For example, for the set of tiles 142a, each tile 4 in that set 142a is loaded with instructions that, when executed, cause the respective tile 4 to issue each of the write requests 72 with an identifier of the key associated with set 142a. The tile 4 issues each of the write requests 72 with the identifier of the key in the header of the Tlink packet. When that packet is converted to the Elink format by the exchange block context 148, that key identifier is consequently included in the header of the Elink packet.

In some embodiments, the key identifier is an identifier of a physical key, which is used by the SXP 730 to identify the unique key (referred to as a logical key) to use for encryption/decryption operations. The concept of a physical key is discussed in more detail later.

Once the SXP 730 has identified the key associated with the set of tiles 142 from which a write request has been issued, the SXP 730 performs encryption operations using the identified key to encrypt the data to be written to the host memory 70. Performing these operations may comprise generating a ciphertext from a plaintext according to a block cipher encryption algorithm. The write request containing the encrypted data is then provided from the SXP 730 to an interface 740 of the device 710 for interfacing with the host 71. In some embodiments, the SXP 730 may be incorporated as part of the interface 740, rather than being a separate entity as shown in FIG. 5. The interface 740 comprises a PCIe controller 740, and is configured to convert the write request packet from the Elink packet format to a PCIe format. The interface 740 then sends the write request packet to the host 71. The host 71 receives the write request and processes the write request to cause the encrypted data to be written to the host memory 70 at the address indicated in the header of the write request packet.

In this way, data encrypted with different keys may be written to the host memory 70, where the key used depends upon the set of tiles 142 from which the write request originated.

In addition to storing different keys associated with different sets of tiles 142, the SXP 730 also stores different sets of state information associated with different sets of tiles 142. A distinct context storage is provided in the SXP 730 for storing each set of state information. Each combination of a unique key with a context storage may be referred to as a "physical key". Each context storage in the SXP 730 is associated with one or more of the sets of tiles 142 shown in FIG. 5.

The capability of the SXP 730 for storing different sets of state information associated with different tiles 4 enables the handling of interleaved write requests issued by different tiles 4.

One example of how such state information may be used is for determining the IV to be used for performing encryption operations. In embodiments, the one or more write requests 72 issued by the tile 4 of the set of tiles 142a comprises a plurality of write requests, including a first write request and a second write request belonging to a single encryption frame. The first write request and the second write request include different plaintext blocks, which the SXP 730 is configured to encrypt using different IVs. The initial IV value is derived from a partial IV included in first packet of the write requests 72, which is concatenated with a counter value held in the SXP 730. The SXP 730 then employs an algorithm whereby the initialisation vector used for encrypting each successive plaintext block in the encryption frame is incremented between each of the blocks. For example, the SXP 730 may encrypt a first plaintext block in the first write request using an IV value, increment the IV value, and then use the incremented IV value to encrypt a second plaintext block in the first write request. When the first plaintext block of the second write request is processed, the IV used will be the incremented value of the IV used to encrypt the final plaintext block in the first write request. Therefore, the processing performed by the SXP 730 to produce the resultant second write request for delivery to the host 71 depends upon the IV value obtained at the end of the processing performed for the first write request. This IV value is, therefore, saved as state information by the SXP 730 at the end of the processing of the first write request, and will be used by the SXP 730 when processing the second write request.

The one or more write requests 73 may be issued at a time such that a write request (i.e. a third write request) of the write requests 73 is received at the SXP 730 after the first write request but before the second write request. In this way, write requests 72, 73 from different tiles 4 may be interleaved.

One way of handling the interleaving of the requests may be to re-order the requests at the SXP 730 such that the first and second write requests are both processed before the third write request. In this way, the results of processing the first write request are available when the second write request is scheduled for processing. However, performing reordering of the write requests returned to tiles 4 across a multi-tile processing unit 2 may require an undesirably large reorder buffer.

The presence of context storages for storing state information associated with different sets of tiles 142 enables the handling of different interleaved write requests without requiring reordering. When the first write request is processed, at least some of the results of processing that first write request are used to update state information (e.g. the IV value as discussed above) associated with the set of tiles 142a. When the third write request is received at the SXP 730, state information associated with the set of tiles 142c may be used when processing the third write request. When the second write request is received at the SXP 730, the state information associated with the set of tiles 142c is saved, and the state information associated with the set of tiles 142a is loaded and used for processing the second write request.

The SXP 730 also maintains state information used for calculating the MAC for an encryption frame. The state information may comprise state information for calculating a Galois Message Authentication code (GMAC). The MAC is calculated by the SXP 730 in dependence upon each of the blocks of data in the encryption frame. When calculating the MAC, the SXP 730 cannot complete the MAC until it receives all of the plaintext for the encryption frame. Therefore, the SXP 730 computes a partial hash using ciphertext derived from the available plaintext of the encryption frame. When the remaining plaintext is received, the SXP 730 uses the partial hash and ciphertext derived from the remaining plaintext to generate the MAC. The partial hash therefore represents state information, which can be stored for handling interleaved write requests.

Figure 6:
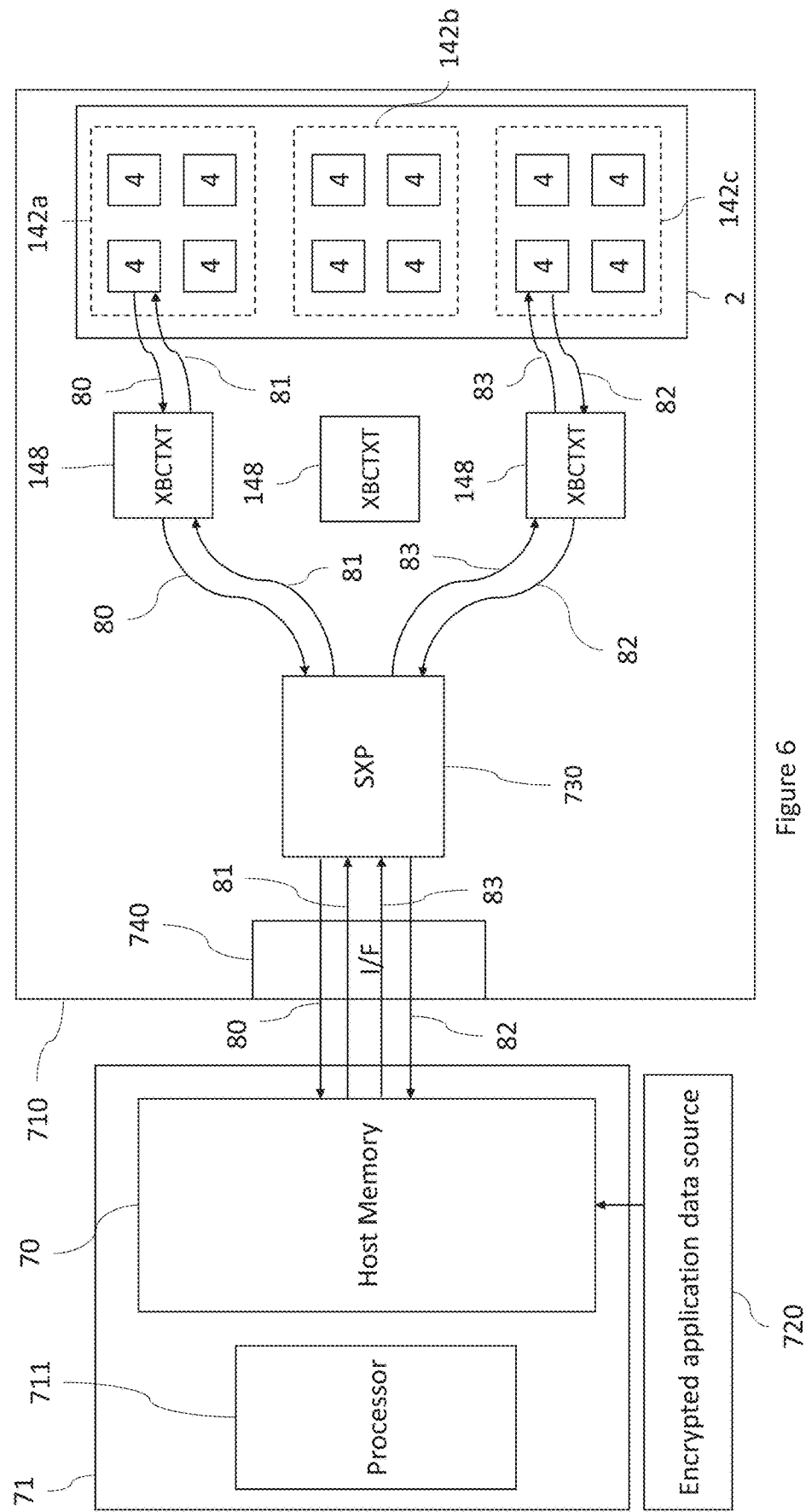
FIG. 6 illustrates the issuance of read requests from tiles of a processing unit to read data from host memory.

Reference is made to FIG. 6, which illustrates how tiles 4 of the example device 710 may issue read requests to read data from the host memory 70. In response to a read request issued by a tile 4, one or more read completions are returned to the tile 4 from the host 71. The read completions comprise the data read from host memory 70. For example, a tile 4 of set of tiles 142*a* is shown issuing a read request 80, in response to which one or more read completions 81 are returned. A tile 4 of a set of tiles 142*c* is also shown issuing a read request 82, in response to which one or more read completions 83 are returned.

When a tile 4 issues a read request, that read request is issued in the Tlink format. The read request is transmitted to the exchange block context 148 for the tile 4. The exchange block context 148 converts the read request to the Elink packet format and passes the read request to the SXP 730.

When the SXP 730 receives the read request, the SXP 730 inserts a bit into the read request indicating that the data to be read requires decryption (this hit may be referred to as the encryption bit).

The read request is passed from the SXP 730 to the interface 740. The interface 740 may comprise a PCIe controller and is configured to convert the read requests to PCIe read requests for dispatch to the host 71.

The interface 740 removes certain information from the read request and stores this information in a look up table of the interface 740. The interface 740 stores the encryption bit into the look up table. The interface 740 stores an identifier of the tile 4 to which the read data is to be returned into the look up table. The tile 4 to which data is to be returned in response to the read request 74 is the same as the tile 4 that issued the request. The interface 740 stores the tile memory address to which the requested data is to be returned. The information that is stored in the look up table is associated with a read completion identifier tag that matches the returned read completions to the associated information in the table. As explained later, the interface 740 may also store an explicit key identifier if this information is required by the SXP 730 for identifying the key to use for performing the decryption operations.

The processor 711 of the host 71 processes the read request and produces one or more read completions comprising the data read from host memory 70 at the address indicated in the read request. The one or more read completions are returned to the interface 740. Each read completion is converted from the PCIe format to the Elink format by the interface. The interface 740 matches an identifier in each read completion in the table to look up information that was stored in the look up table by the interface 740 from the associated read request. This information, including any explicit key identifier bits if they were stored at the interface 740, is added to each read completion. Each read completion is then returned to the SXP 730 from the interface 740.

The SXP 730 stores a plurality of keys. When the SXP 730 receives a read completion, the SXP 730 identifies a key to use that is associated with the set of tiles 142 to which the read completion is to be delivered.

In some example embodiments, the SXP 730 may identify the key to use based on an explicit identifier of the tile 4 or set of tiles 142 to which the read completions is to be delivered. This information is contained in the read requests dispatched by toes 4 and inserted into the corresponding read completions using the mechanism at the interface 740 as discussed.

In some example embodiments, the SXP 730 may identify the key based on an explicit identifier of the key contained in a read completion. In this case, each tile 4 is loaded with a set of computer readable instructions configured to issue read requests containing the key identifier that corresponds to the set of tiles 142 to which the respective tile 4 belongs. For example, for the set of tiles 142*a*, at least one of the tiles 4 in that set 142*a* is loaded with instructions that, when executed, cause the respective tile 4 to issue each of its read requests with an identifier of the key associated with set of tiles 142*a*. This key identifier may be stored in the interface 740, and inserted into corresponding read completions returned from the host 71. The SXP 730 may then identify the key to use for performing decryption operations associated with the read completions using the key identifier contained in the read completions. The key identifier may be an identifier of a physical key, the concept of which is discussed in more detail later.

In this way, data encrypted with different keys may be read from the host memory 70, where the key used depends upon the set of tiles 142 from which the read request originated.

As noted above, the SXP 730 stores state information associated with different sets of tiles 142. The presence of different sets of state information associated with different tiles 4 enables the handling of interleaved read completions for delivery to different tiles 4.

One example of how such state information may be used is for determining the IV to be used performing decryption operations. In embodiments, the one or more read completions 81 for delivery to a tile 4 of the set of tiles 142*a* comprises a plurality of read completions, including a first read completion and a second read completion belonging to the same encryption frame. The first read completion and second read completion include different ciphertext blocks, which the SXP 730 is configured to decrypt using different IVs. The initial IV value is derived from a partial IV included in first packet of the read completions 81, which is concatenated with a counter value held in the SXP 730. The SXP 730 employs an algorithm whereby the initialisation vector used for decrypting each successive ciphertext block is incremented between each block in the encryption frame. For example, the SXP 730 may decrypt a first ciphertext block in the first read completion using an IV value, increment the IV value, and then use the incremented IV value to decrypt a second ciphertext block in the first read completion. When the first ciphertext block of the second read completion is processed, the IV used will be the result of incrementing the IV used to decrypt the final ciphertext block in the first read completion. Therefore, the processing performed by the SXP 730 for the second read completion depends upon the IV value obtained at the end of the processing performed for the first read completion. This IV value is, therefore, saved as state information by the SXP 730 at the end of the processing of the first read completion, and will be used by the SXP 730 when processing the second read completion.

The interface 740 guarantees that read completions returned in response to the same read request will be sent to the SXP 730 in order. However, no guarantee of order is provided for read completions associated with different read requests. The one or more read completions 83 may be issued from the host 71 at a time such that a read completion (i.e. a third read completion) of the read completions 83 is received at the SXP 730 after the first read completion; but before the second read completion. In this way; read completions 81; 83 for delivery to different tiles 4 may be interleaved.

One way of handling the interleaving of the read completions may be to re-order the completions at the SXP 730 such that the first and second read completions are both processed before the third read completion. In this way, the results of processing the first read completion are available when the second read completion is scheduled for processing. However; performing reordering of the read completions returned to tiles 4 across a multi-tile processing unit 2 may require an undesirably large reorder buffer.

The presence of context storages for storing state information associated with different sets of tiles 142 enables the handling of different interleaved read completions without requiring reordering. When the first read completion is processed, at least some of the results of processing that first read completion are used to update the state information associated with the set of tiles 142a. When the third read completion is received at the SXP 730, the state information associated with the set of tiles 142c is loaded and is used when processing the third read completion. When the second read completion is received at the SXP 730, the state information associated with the set of tiles 142c is saved, and the state information (e.g. the IV value as discussed above) associated with the set of tiles 142a is loaded and used for processing the second read completion.

The SXP 730 also stores state information for calculating the MAC, so as to check the MAC in one of the received read completions. This state information for calculating the MAC for the read completions may comprise the same components as the state information for calculating the MAC for the write requests as discussed above.

In the example embodiments shown in FIGS. 5 and 6, a single SXP 730 is illustrated. However, separate SXPs 730 may be provided in the device 710 for performing encryption vs decryption. For example, a first SXP 730 may be provided for performing encryption operations for data contained in write requests, whereas a second SXP 730 may be provided for performing decryption operations for data contained in read completions. A single set of tiles 142 may therefore be associated with one set of state information for handling write requests and another set for handling read completions.

Figure 7:
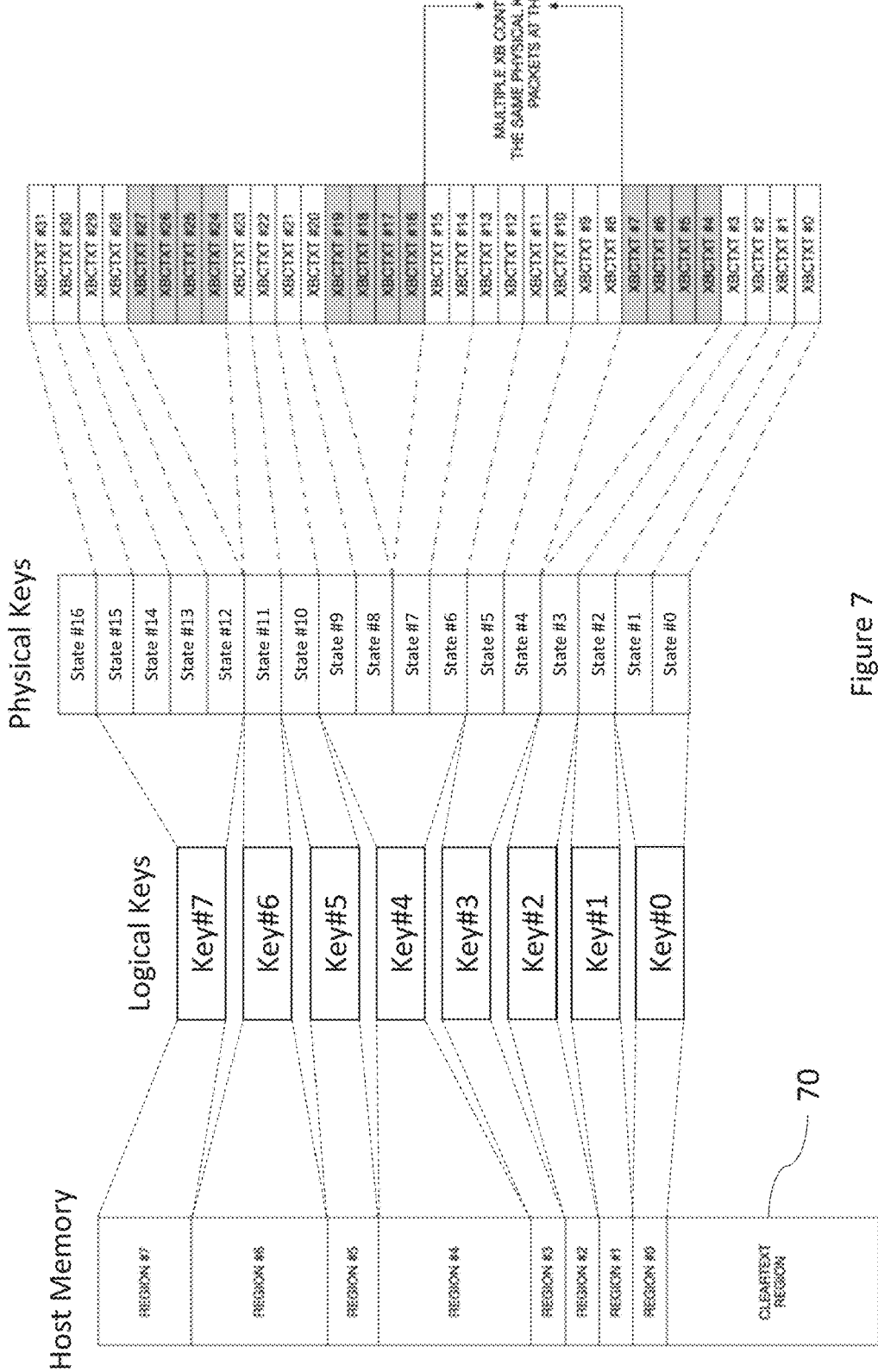
FIG. 7 illustrates the mapping between sets of tiles, state information; encryption decryption keys, and regions of external storage.

Reference is made to FIG. 7, which illustrates how different sets of tiles 142 may map to different sets of state information and to different keys used for encryption and decryption.

In FIG. 7, each of the set of tiles 142 is represented by the exchange block context 148 with which it is associated. For example, exchange block context XBCTXT #31 is associated with one set of tiles 142, exchange block context XBCTXT #30 is associated with another set of tiles 142, etc.

At least some of the sets of tiles 142 are associated with context storage in the SXP 730 for storing a set of state information held in the SXP 730. Some of the sets of state information are dedicated to a single sets of tiles 142. For example, state #15 is only associated with exchange block context XBCTXT #31 and with the sets of tiles 142 associated with XBCTXT #31. The tiles 4 in a set of tiles 142 associated with the same set of state information are constrained such that only one of these tiles 142 may have an outstanding read request or write encryption frame open at any one time. This constraint is implemented since the SXP 730 is unable to handle interleaved read completions for which only a single context storage is provided, since to handle such interleaved read completions without reordering the completions would require multiple sets of state information. Similarly, the constraint is applied for write encryption frames since the SXP 730 is unable to handle interleaved write requests for which only a single context storage is provided, since to handle such interleaved write requests without reordering the completions would require multiple sets of state information.

Some of the sets of state information are associated with multiple sets of tiles 142. For example, the sets of tiles 142 associated with exchange block contexts XBCTXT #14 and XBCTXT #15 are both associated with the set of state information state #7. The tiles 4 in multiple sets of tiles 142 associated with the same set of state information are constrained such that only one of these tiles 142 may have an outstanding read request open at any one time or may issue write requests at any one time. The constraints dictating when tiles 4 in a set 142 may issue read or write requests are enforced by the relevant the exchange block context using the mechanism shown in FIG. 2.

Some of the sets of tiles 142 (e.g. the set of tiles 142 associated with XBCTXT #19) are not associated with a set of state information and are configured to not issue write or read requests when not associated with a set of state information.

In FIG. 7, the mapping to different unique encryption/decryption keys is also shown. These keys are referred to as logical keys. The logical keys are symmetric keys. The logical keys Key #0 to Key #7 shown in FIG. 7 are all unique. Some logical keys are associated with a single set of tiles 142. For example, key #6 is associated with the sets of tiles 142 associated with XBCTXT #23 only. Therefore, only this set of tiles can read and write data encrypted using this logical key. Some logical keys are associated with multiple sets of tiles 142. For example, Key #0 is associated with the sets of tiles 142 associated with XBCTXT #0 and XBCTXT #1. Therefore, either of these sets of tiles 142 may read and write data encrypted using this logical key. A single logical key may be associated with multiple sets of state information. For example, Key #0 is associated with state #1 and state #0. This enables multiple different tiles 4 associated with the same logical key to have outstanding read requests open at any one time or to issue write encryption frames at the same time. Some sets of tiles 142 (e.g. the set of tiles 142 associated with XBCTXT #19) are not associated with a logical key and cannot send or receive data.

In the example shown in FIG. 7, the host memory 70 is divided into multiple different regions, where data in different regions is encrypted using different keys. For example, the data stored in region #7 is encrypted with key #7. The data stored in region #6 is encrypted using key #6. The host memory 70 also comprises a cleartext region for storing unencrypted data. One or more of the sets of tiles 142 may be enabled to read and write data to the cleartext region. The regions of memory shown in FIG. 7 are contiguous in the virtual address space that is targeted by the read or write requests issued by the tiles 4. However, in other embodiments, regions of memory containing data encrypted using the same logical key may not be arranged contiguously in the virtual address space as shown in FIG. 7.

The example mapping shown in FIG. 7 may be applied either for performing the encryption processing for write requests, the decryption processing for read completions, or both of these. In other words, it would be appreciated that the mapping between sets of tiles 142 and keys may be the same or different for write requests vs read completions.

The mapping used in FIG. 7 can be reinitialised by changing the mapping information held in the SXP 730. Thus, although some of the tiles 4 (e.g. those associated with XBCTXT #19) are configured to not issue requests when not associated with a set of state information, those tiles 4 are configured to do so when the mapping is updated such that those tiles 4 are associated with a set of state information.

Figure 8:
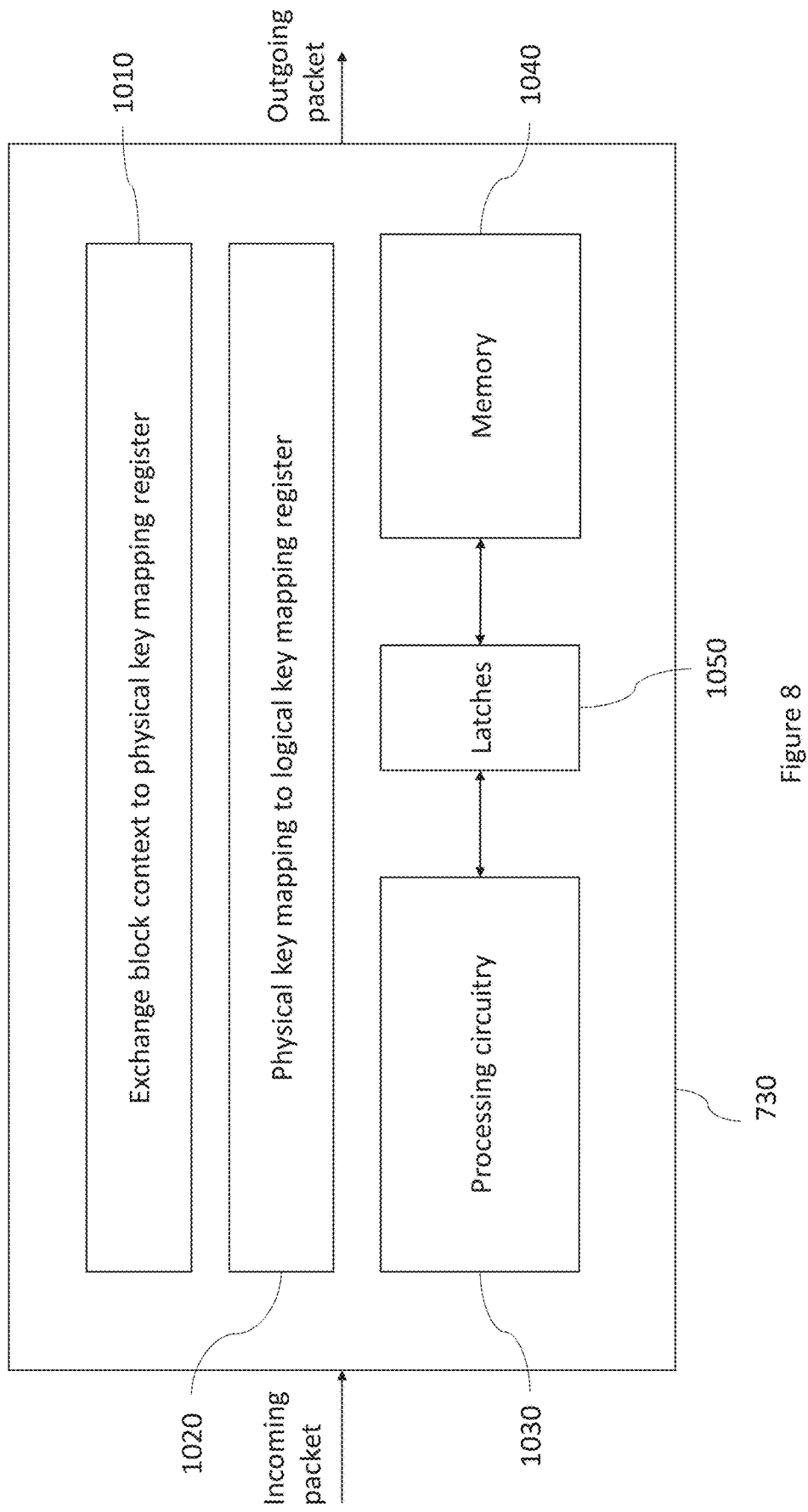
FIG. 8 is a schematic diagram of an encryption unit according to example embodiments of the application.

Reference is made to FIG. 8, which illustrates an example of the SXP 730. The SXP 730 includes two registers 1010, 1020 that are used to identify the key to be used for encryption or decryption operations when a write request or read completion is received at the SXP 730. These registers 1010, 1020 provide a two level mapping from the sets of tiles 142 to the logical keys, allowing the state information and the logical key to both be identified from bits in the write request or read completion identifying the tile 4 or set of tiles with which that request/completion is associated. A first register 1010 stores mappings between the sets of tiles 142 and the sets of state information. The second register 1020 stores mappings between the state information and the encryption keys. Processing circuitry 1030 is also provided for performing the encryption/decryption operations and the MAC generation/checking operations.

When a data packet (which could be a write request or read completion) arrives at the SXP 730, the set of state information associated with the associated set of tiles 142 (to which the data packet is received from or is to be delivered to) is identified from the register 1010. The state information is identified using an identifier of the associated tile 4 or set of tiles 142 contained in the data packet.

Having identified the state information, the logical key associated with that set of state information is identified from the register 1020. The SXP 730 identifies the logical key by using an identifier of the physical key to obtain an associated logical key identifier from the register 1020. The physical key identifier used to identify the logical key is obtained from the register 1010.

The processing circuit 1030 uses the identified state information and the identified logical key to perform encryption and decryption operations associated with the data packet. To do so, the identified logical key is loaded from the memory 1040 into one of the latches 1050. The identified state information is loaded from part of the memory 1040 (i.e. from the context storage for this state information) into one of the latches 1050. The key and state information in the latches 1050 is then used to perform the operations associated with the data packet.

The two level mapping illustrated in FIG. 7, and implemented using the registers shown in FIG. 8, may avoid a need for multiple identifiers (i.e. for the physical key and logical key) in the data packets received at the SXP 730.

Figure 9:
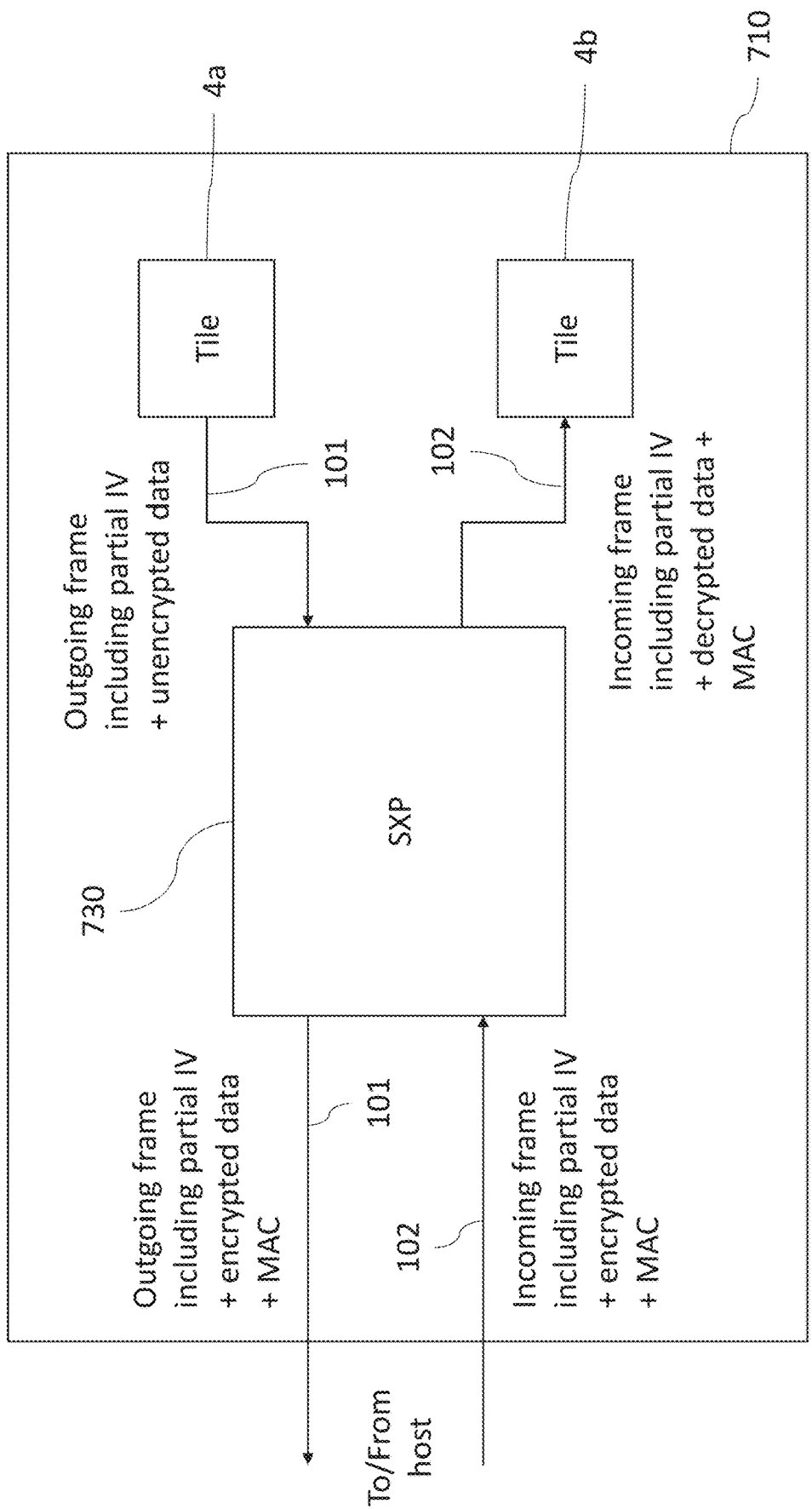
FIG. 9 is a diagram illustrating the movement of different data components to and from tiles and through the encryption hardware.

Reference is made to FIG. 9, which illustrates an example of the movement of data when data is written to host memory 70 by a tile 4a and read from host memory 70 by a tile 4b. In this example, the tiles 4a, 4b are shown as two separate tiles 4. However, in other examples, the tiles 4a, 4b may be the same tile 4. In the example, the exchange block 78 is omitted for simplification of the Figure.

The tile 4a sends one or more write requests 101 to the SXP 730. The one or more write requests 101 take the same form and are processed in the same way as the requests 72, 73 already discussed. The one or more write requests 101 constitute an outgoing encryption frame. The outgoing frame includes the unencrypted data. The outgoing frame from the tile 4a includes part of the initialisation vector, which is determined by the tile 4a.

The SXP 730 completes the initialisation vector by adding a count value (which is incremented for each successive plaintext block in the encryption frame). The part of the initialisation vector received from the tile 4a may be 96 bits in length, with the full initialisation vector being 128 bits when the count value is appended. The SXP 730 encrypts the data using the IVs and calculates the MAC. The calculation of the MAC happens in parallel with the encryption operations. A partial hash for determining the MAC is produced by the SXP 730 after the calculation of each ciphertext block, with the SXP 730 finalising the MAC only when it has encrypted all of the plaintext for the frame. The outgoing frame 101 from the SXP 730 includes the encrypted data, the part of the initialisation vector received from the tile 4a, and the MAC. The SXP 730 sends the one or more write requests 101 to the host 71, which writes the encrypted data, the MAC and the initialisation vector to host memory 70.

In response to a read request from tile 4b, the host 71 provides encrypted data in an incoming encryption frame 102. The incoming frame 102 is in the form of one or more read completions 102. The incoming frame 102 includes the content of the outgoing frame 101 sent by the SXP 730, i.e. it includes the part of the initialisation vector and the MAC in addition to the encrypted data. The incoming frame 102 is provided to the SXP 730. The SXP 730 completes the initialisation vector by adding a count value (which is incremented between each successive ciphertext block in the encryption frame). The SXP 730 decrypts the data using the IVs and checks the MAC by recalculating it using the received ciphertext and the IVs. If the MAC is determined to be correct, the frame 102 is provided to the tile 4b.

The tile 4b checks that part of the initialisation vector is as expected. The tile 4b does not require the MAC and, therefore, deletes the MAC. The tile 4b stores the decrypted data in its memory in response to determining that the part of the initialisation vector is as expected.

Although the above embodiments have described the storage that is read from and written to as being host memory 70, the storage need not be host storage, but could be another type of storage external to the tiles 4.

Figure 10:
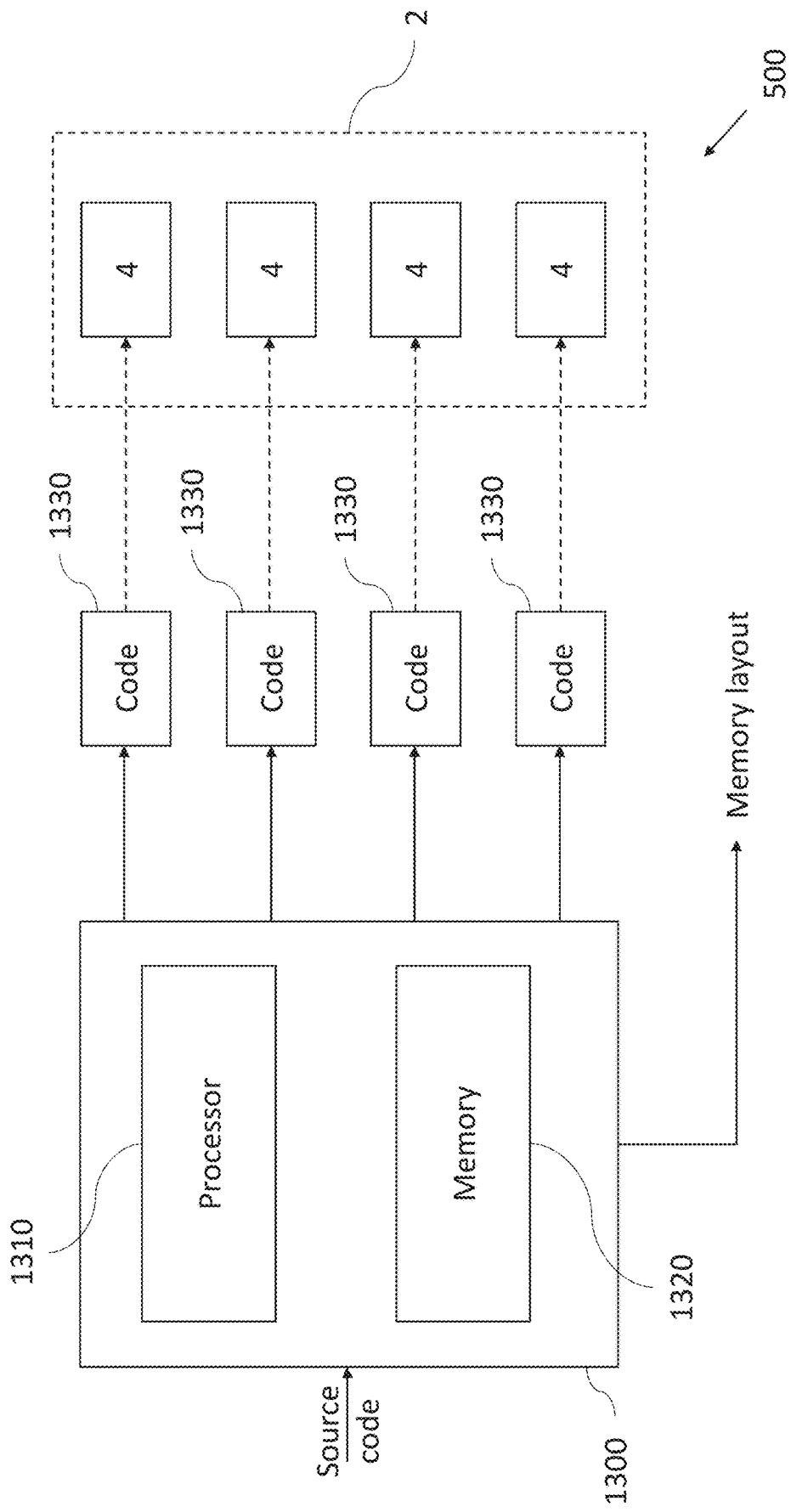
FIG. 10 is a diagram illustrating the compilation of different sets of code for running on the tiles and the determination of the layout of data in host memory.

Reference is made to FIG. 10, which illustrates the compilation of the different sets of application code that are provided to run on each of the tiles 4. A data processing system 1300 is provided for performing the compilation steps. The data processing system comprises a processor 1310 and a memory 1320. The memory 1320 stores executable code which, when executed by the processor causes the compilation steps to be performed.

The data processing system 1300 receives the source code for the application to be executed on the processing unit 2. The system 1300 produces from this source code, a set of compiled code 1330 for running on each of the tiles 4. Each set of code 1330 comprises instructions for reading and writing data to from storage external to the processing unit 2 as described above. Since each tile 4 is associated with a certain key, each set of code 1330 is arranged by the compiler to read only from addresses in the memory 70 at which data is encrypted in accordance with the key associated with the tile 4 on which the respective code 1330 executes. To ensure that the tiles 4 read the correct data, the system 1300 further determines the layout in memory 70 of the data to be supplied to the processor tiles 4. Specifically, the system 1300 determines which keys will be used to encrypt the data at different locations in the memory 70. Determining this layout in conjunction with mapping the code 1330 sets to the tiles 4, ensures that when the tiles 4 read from locations in memory 70, the data at the locations from which they read is encrypted using the key which that tile 4 is associated. This ensures that the tiles 4 are able to obtain the decrypted data when they issue read requests.

Figure 11:
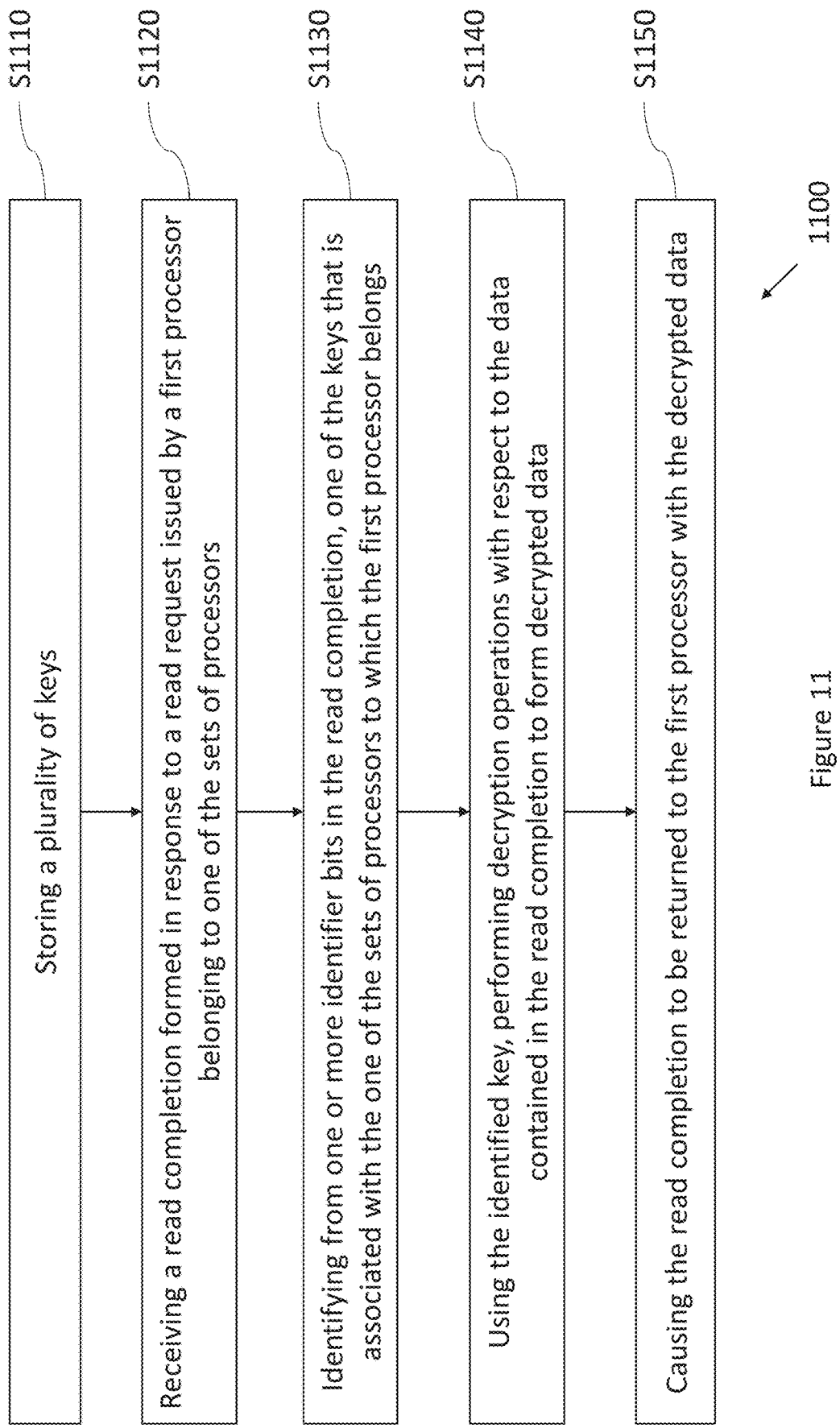
FIG. 11 is a method for selecting a key and decrypting data using that key.

Reference is made to FIG. 11, which illustrates a method 1100 according to embodiments of the application. The method 1100 is performed in an encryption unit, such as the SXP 730 discussed above.

At S1110, the encryption unit stores a plurality of keys in its memory.

At S1120, an interface of the encryption unit receives a read completion formed in response to a read request issued by a first processor belonging to one of the sets of processors.

At S1130, a processor of the encryption unit identifies from one or more identifier bits in the read completion, one of the keys that is associated with the one of the sets of processors to which the first processor belongs.

At S1140, using the identified key, a processor of the encryption unit performs decryption operations with respect to the data contained in the read completion to form decrypted data.

At S1150, a processor of the encryption unit causes the read completion to be returned to the first processor with the decrypted data.

Figure 12:
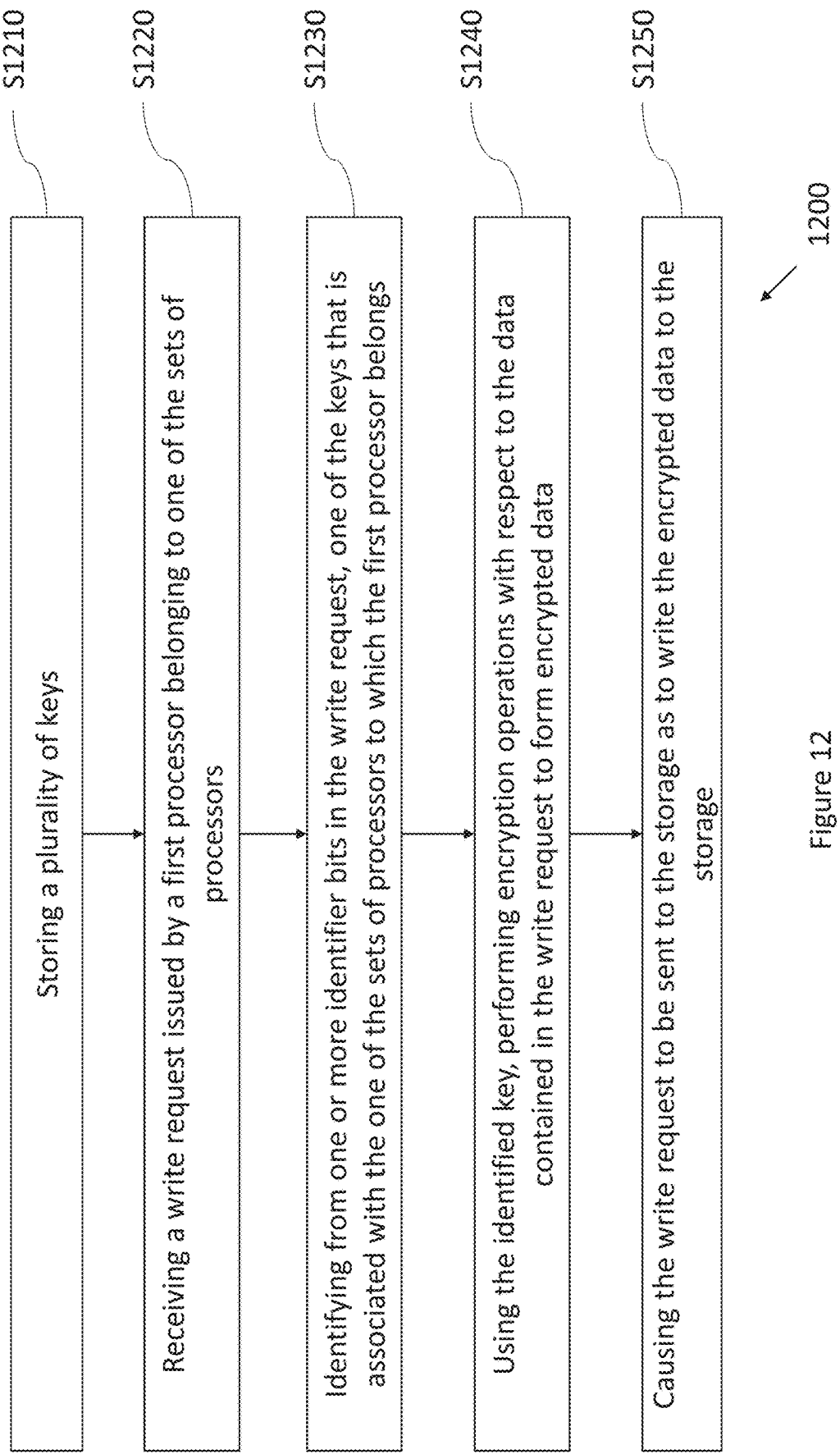
FIG. 12 is a method for selecting a key and encrypting data using that key

Reference is made to FIG. 12, which illustrates a method 1200 according to embodiments of the application. The method 1200 is performed in an encryption unit, such as the SXP 730 discussed above.

At S1210, the encryption unit stores a plurality of keys in its memory.

At S1220, an interface of the encryption unit receives a write request issued by a first processor belonging to one of the sets of processors.

At S1230, a processor of the encryption unit identifies from one or more identifier bits in the write request, one of the keys that is associated with the one of the sets of processors to which the first processor belongs.

At S1240, using the identified key, a processor of the encryption unit performs encryption operations with respect to the data contained in the write request to form encrypted data At S1250, a processor of the encryption unit causes the write request to be sent to the storage so as to write the encrypted data to the storage.

It will be appreciated that the above embodiments have been described by way of example only.

The invention claimed is:

1. An integrated circuit for acting as an accelerator subsystem for processing data received from a storage, the integrated circuit comprising:
a processing unit comprising a plurality of sets of processors, wherein each of the processors is operable to issue read requests to read data from the storage;
at least one encryption unit comprising a memory configured to store a plurality of keys, wherein each of at least some of the keys are associated with different ones of the sets of processors, wherein the at least one encryption unit comprises processing circuitry configured to:
receive a read completion formed in response to a read request issued by a first processor belonging to one of the sets of processors, the read completion comprising data read from the storage;
identify from one or more identifier bits in the read completion, a first key of the plurality of keys that is associated with the one of the sets of processors to which the first processor belongs;
using the first key, perform decryption operations with respect to the data contained in the read completion to form decrypted data; and
cause the read completion to be returned to the first processor with the decrypted data,
wherein the at least one encryption unit comprises a plurality of context storages, each of the context storages being for storing state information associated with an encryption frame comprising a plurality of read completions, wherein each of the context storages is associated with one or more of the sets of processors,
wherein the processing circuitry of the at least one encryption unit is configured to:
identify from the one or more identifier bits, one of the context storages associated with the one of the sets of processors comprising the first processor; and
use the identified one of the context storages for storing state information associated with an encryption frame comprising the read completion.

2. The integrated circuit of claim 1, wherein the first processor comprises at least one execution unit configured to execute computer readable instructions to cause the read request to be transmitted with the one or more identifier bits.

3. The integrated circuit of claim 2, comprising an interface to the storage, wherein the interface comprises processing circuitry configured to:
receive the read request issued by the first processor;
store in a look up table of the interface, the one or more identifier bits extracted from the read request;
upon receiving the read completion returned in response to the read request, insert the one or more identifier bits into the read completion before providing the read completion to the at least one encryption unit.

4. The integrated circuit of claim 1, wherein each of the plurality of keys is associated with one or more of the context storages to be used for storing state information associated with decryption operations performed using the respective key of the plurality of keys.

5. The integrated circuit of claim 4, wherein each of at least some of the keys are associated with multiple ones of the context storages configured to store multiple sets of state information associated with different encryption frames and suitable for performing decryption operations using the respective key of the at least some of the keys.

6. The integrated circuit of claim 4, wherein the step of identifying the one of the keys comprises:
performing the step of identifying the one of the context storages by obtaining an identifier of the one of the context storages from a first register of the at least one encryption unit; and
using the identifier of the one of the context storages to identify from a second register of the at least one encryption unit, the one of the keys which is associated with the identified one of the context storages.

7. The integrated circuit of claim 1, wherein the one or more identifier bits comprise an index of the one of the keys.

8. The integrated circuit of claim 1, wherein the one or more identifier bits comprise an identifier of the first processor.

9. The integrated circuit of claim 1, wherein the one or more identifier bits comprise an identifier of the one of the sets of processors to which the first processor belongs.

10. The integrated circuit of claim 1, wherein the storage is a memory of a host device configured to supply workloads to the accelerator subsystem.

11. The integrated circuit of claim 10, wherein the first processor comprises at least one execution unit configured to execute computer readable instructions to cause the read request to be transmitted with the one or more identifier bits, wherein the processing unit is configured to receive from the host device at least part of the computer readable instructions.

12. The integrated circuit of claim 1, wherein the storage is a memory of the integrated circuit.

13. The integrated circuit of claim 12, wherein the memory of the integrated circuit is a dynamic random access memory.

14. The integrated circuit of claim 1, wherein the read completion comprises a message authentication code, wherein the processing circuitry of the at least one encryption unit is configured to check that the message authentication code matches an expected message authentication code for the data read from the storage.

15. The integrated circuit of claim 1, wherein the decryption operations are performed according to Advanced Encryption Standard.

16. The integrated circuit of claim 1, wherein the decryption operations are performed using at least part of an initialisation vector contained in the read completion.

17. The integrated circuit of claim 16, wherein the processing circuitry of the at least one encryption unit is configured to complete the initialisation vector.

18. The integrated circuit of claim 16, wherein the processing circuitry of the at least one encryption unit is configured to increment the initialisation vector using a counter value for each block of ciphertext data contained in the read completion.

19. An integrated circuit for acting as an accelerator subsystem for processing data and writing results of the processing to a storage, the integrated circuit comprising:
  a plurality of sets of processors, wherein each of the processors is operable to issue write requests to write data to the storage;
  an encryption unit comprising a memory configured to store a plurality of keys that are associated with the sets of processors, wherein the encryption unit comprises processing circuitry configured to:
    receive a write request issued by a first processor belonging to one of the sets of processors, the write request comprising data to be written to the storage;
    identify from one or more identifier bits of the write request, a first one of the keys that is associated with the one of the sets of processors to which the first processor belongs;
    using the first one of the keys, perform encryption operations with respect to the data contained in the write request to form encrypted data; and
    cause the write request to be sent to the storage so as to write the encrypted data to the storage,
  wherein the encryption unit comprises a plurality of context storages, each of the context storages being for storing state information associated with an encryption frame comprising a plurality of write requests, wherein each of the context storages is associated with one or more of the sets of processors, wherein the processing circuitry of the encryption unit is configured to:
    identify from the one or more identifier bits, one of the context storages associated with the one of the sets of processors comprising the first processor; and
    use the identified one of the context storages for storing state information associated with performing encryption processing for an encryption frame comprising the write request.

20. The integrated circuit of claim 19, wherein each of the plurality of keys is associated with one or more of the context storages to be used for storing state information associated with encryption operations performed using the respective key of the plurality of keys.

21. The integrated circuit of claim 19, wherein the step of identifying the one of the keys comprises:
  performing the step of identifying the one of the context storages associated with the write request; and
  using an identifier of the identified one of the context storages to identify the one of the keys that is associated with the identified one of the context storages.

22. The integrated circuit of claim 19, wherein the first processor comprises at least one execution unit configured to execute computer readable instructions to cause the write request to be transmitted with the one or more identifier bits.

23. The integrated circuit of claim 19, wherein the one or more identifier bits comprise an index of the one of the keys.

24. The integrated circuit of claim 19, wherein the one or more identifier bits comprise an identifier of the first processor.

25. The integrated circuit of claim 19, wherein the one or more identifier bits comprise an identifier of the one of the sets of processors to which the first processor belongs.

26. A method for decrypting data read by a processing unit comprising a plurality of sets of processors, wherein each of the processors is operable to issue read requests to read data from a storage and to process the data read from storage, the method comprising:
  storing a plurality of keys that are associated with the sets of processors;
  receiving a read completion formed in response to a read request issued by a first processor belonging to one of the sets of processors, the read completion comprising data read from the storage;
  identifying from one or more identifier bits in the read completion, a first one of the keys that is associated with the one of the sets of processors to which the first processor belongs;
  using the first one of the keys, performing decryption operations with respect to the data contained in the read completion to form decrypted data; and
  causing the read completion to be returned to the first processor with the decrypted data,
  the method further comprising:
  causing the read request to be transmitted with the one or more identifier bits by the first processor;
  at an interface to the storage:
    receiving the read request issued by the first processor;
    storing in a look up table of the interface, the one or more identifier bits extracted from the read request; and
    upon receiving the read completion returned in response to the read request, inserting the one or more identifier bits into the read completion before providing the read completion to the at least one encryption unit.

27. A method for encrypting data written by a processing unit comprising a plurality of sets of processors, wherein each of the processors is operable to process data and issue write requests to write results of processing the data to a storage, the method comprising:

storing a plurality of keys, wherein each of at least some of the keys are associated with different ones of the sets of processors;

receiving a write request issued by a first processor belonging to one of the sets of processors, the write request comprising data to be written to the storage;

identifying from the write request, a first one of the keys that is associated with the one of the sets of processors to which the first processor belongs;

using the first one of the keys, performing encryption operations with respect to the data contained in the write request to form encrypted data;

causing the write request to be sent to the storage;

identifying from the one or more identifier bits, one of a plurality of context storages associated with a set of processors comprising the first processor, each of the plurality of context storages being for storing state information associated with an encryption frame comprising a plurality of write requests, wherein each of the context storages is associated with one or more sets of processors; and using the identified one of the context storages for storing state information associated with performing encryption processing for an encryption frame comprising the write request.

28. A computer program comprising storing computer readable instructions on a non-transitory computer-readable storage medium which, when executed by at least one processor, cause a method for decrypting data read by a processing unit to be carried out, the processing unit comprising a plurality of sets of processors, wherein each of the processors is operable to issue read requests to read data from a storage and to process the data read from the storage, the method comprising: storing a plurality of keys that are associated with the sets of processors; receiving a read completion formed in response to a read request issued by a first processor belonging to one of the sets of processors, the read completion comprising data read from the storage; identifying from the read completion, a first one of the keys that is associated with the one of the sets of processors to which the first processor belongs; using the first one of the keys, performing decryption operations with respect to the data contained in the read completion to form decrypted data; causing the read completion to be returned to the first processor with the decrypted data; identifying from the one or more identifier bits, one of a plurality of context storages associated with a set of processors comprising the first processor, each of the plurality of context storages being for storing state information associated with an encryption frame comprising a plurality of read completions, wherein each of the plurality of context storages is associated with one or more sets of processors; and using the identified one of the context storages for storing state information associated with an encryption frame comprising the read completion.

29. A computer program comprising storing computer readable instructions on a non-transitory computer-readable storage medium which, when executed by at least one processor, cause a method for encrypting data written by a processing unit to be carried out, the processing unit comprising a plurality of sets of processors, wherein each of the processors is operable to process data and issue write requests to write results of processing the data to a storage, the method comprising: storing a plurality of keys that are associated with different ones of the sets of processors; receiving a write request issued by a first processor belonging to one of the sets of processors, the write request comprising data to be written to the storage; identifying from the write request, a first one of the keys that is associated with the one of the sets of processors to which the first processor belongs; using the first one of the keys, performing encryption operations with respect to the data contained in the write request to form encrypted data; causing the write request to be sent to the storage; identifying from the one or more identifier bits, one of a plurality of context storages associated with a set of processors comprising the first processor, each of the plurality of context storages being for storing state information associated with an encryption frame comprising a plurality of write requests, wherein each of the context storages is associated with one or more sets of processors; and using the identified one of the context storages for storing state information associated with performing encryption processing for an encryption frame comprising the write request.

* * * * *